US008493447B2

(12) United States Patent
Kaneko et al.

(10) Patent No.: US 8,493,447 B2
(45) Date of Patent: Jul. 23, 2013

(54) IMAGE SYNTHESIS APPARATUS AND IMAGE SYNTHESIS METHOD

(75) Inventors: Soutaro Kaneko, Kawasaki (JP); Toru Tsuruta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 650 days.

(21) Appl. No.: 12/553,463

(22) Filed: Sep. 3, 2009

(65) Prior Publication Data
US 2010/0110234 A1 May 6, 2010

(30) Foreign Application Priority Data

Nov. 4, 2008 (JP) .................. 2008-283655

(51) Int. Cl.
*H04N 7/18* (2006.01)
(52) U.S. Cl.
USPC ........... 348/148; 348/143; 348/159; 382/195; 382/199; 382/203; 382/206
(58) Field of Classification Search
USPC .................. 348/148, 143, 159; 382/195, 199, 382/203, 206
See application file for complete search history.

(56) References Cited

U.S. PATENT DOCUMENTS

| 5,742,354 | A | 4/1998 | Vlahos et al. | |
| 7,139,412 | B2 * | 11/2006 | Kato et al. | 382/104 |
| 2002/0196340 | A1 | 12/2002 | Kato et al. | |
| 2009/0009604 | A1 * | 1/2009 | Kanaoka et al. | 348/148 |

FOREIGN PATENT DOCUMENTS

| EP | 2 012 271 | 1/2009 |
| JP | 11-3414 | 1/1999 |
| JP | 2002-324235 | 11/2002 |
| JP | 2007-141098 | 6/2007 |
| JP | 2008-77595 | 4/2008 |
| JP | 2008-79248 | 4/2008 |

OTHER PUBLICATIONS

Uyttendaele M et al: "Eliminating ghosting and exposure artifacts in image mosaics", Proceedings 2001 IEEE Conference. on Computer Vision and Pattern Recognition. CVPR 2001. Kauai, Hawaii, Dec. 8-14, 2001; [Proceedings of the IEEE Computer Conference on Computer Vision and Pattern Recognition], Los Alamitos, CA, IEEE Comp. Soc, US, vol. 2, Dec. 8, 2001, pp. 509-516, XP010584166, ISBN: 978-0-7695-1272-3.
Extended European Search report issued Sep. 8, 2011 in corresponding European Patent Application No. 09170619.2.
Yu-Chih Liu et al: "Bird's-Eye View Vision System for Vehicle Surrounding Monitoring", Feb. 18, 2008, Robot Vision; [Lecture Notes in Computer Science], Springer Berlin Heidelberg, Berlin, Heidelberg, pp. 207-218, XP019086912, ISBN: 978-3-540-78156-1.
Japanese Office Action dated May 29, 2012 issued in corresponding Japanese Patent Application No. 2008-283655.

* cited by examiner

*Primary Examiner* — Shawn An
(74) *Attorney, Agent, or Firm* — Staas & Halsey LLP

(57) ABSTRACT

An image synthesis apparatus includes an image obtainer obtaining a plurality of images taken by a plurality of cameras; a pixel value corrector which, with respect to each of the images, calculates a correction factor of an average pixel value in overlap regions located at the both ends of an image and, in the adjacent direction of the images, calculates the correction factor of a pixel value in a region other than the overlap regions by a predetermined continuous function connecting the correction factors in the overlap regions and corrects the entire image based on the calculated correction factor; a synthetic image generator synthesizing the images corrected by the pixel value corrector to generate one synthetic image; and an image output outputting the synthetic image to an external apparatus.

8 Claims, 21 Drawing Sheets

IMAGE SYNTHESIS APPARATUS AND IMAGE SYNTHESIS METHOD

CROSS-REFERENCE TO RELATED APPLICATIONS

This application is based upon and claims the benefit of priority of the prior Japanese Patent Application No. 2008-283655, filed on Nov. 4, 2008 the entire contents of which are incorporated herein by reference.

BACKGROUND

1. Field

This invention relates to an image synthesis apparatus and an image synthesis method.

2. Description of the Related Art

There has been an image synthesis apparatus that synthesizes images around a vehicle. The images are taken by a plurality of in-vehicle cameras mounted on the periphery of the vehicle, and the synthetic image is displayed, thereby facilitating the grasp of the situation around the vehicle and the confirmation of safety by a driver.

For example, as illustrated in FIG. 19, in-vehicle cameras C1 to C4 are respectively provided on the front, back, left, and right sides of a vehicle, and an image in each direction is taken by the in-vehicle cameras C1 to C4. Image processing, such as viewpoint conversion, is applied to the taken images that are to be synthesized, allowing the synthesized images to be displayed as one image, as shown in FIG. 19, as if the driver's own vehicle were viewed from above. Such a synthetic image is generated and displayed by the prior art image synthesis apparatus, allowing a driver to grasp the situation around the driver's own vehicle by one image. In addition, the positional relation between the driver's own vehicle and obstacles can be easily confirmed.

However, when images are simply synthesized in the above apparatus, for example, automatic adjustment may be performed due to a difference in the direction to a light source, so that the cameras C1 to C4 have different irises and so on. Especially, in image taking regions E1 to E4 of the cameras C1 to C4, when a brightness value of regions R1 to R4 (hereinafter referred to as "overlap regions R1 to R4") overlapping the image taking region E of the adjacent camera C is different from a brightness value of the overlap region R of the relevant adjacent camera C, there is a problem that joints b1 to b4 between each image are conspicuously displayed in the generated synthetic image.

In order to solve the above problem, a technique has been developed for correcting a pixel value of a taken image by image processing to thereby generate a natural-looking synthetic image.

Japanese Laid-open Patent Publication No. 2008-77595 discloses calculating correction factors so that the brightness value of the overlap regions R1 and R2 in the camera C1 and the brightness value of the overlap region R1 in the camera C4 and the overlap region R2 in the camera C2 are equal to each other. The average value of the calculated correction factors of the overlap regions R1 and R2 is mapped to the correction factor of the entire image taking region E1 of the camera C1.

For example, when an image taken by the camera C1 is corrected, the correction factor in a pixel h1 in the overlap region R1 is represented as G(h1), and the correction factor in a pixel h2 in the overlap region R2 is represented as G(h2). As illustrated in FIG. 20, the average value G(h) of the correction factors G(h1) and G(h2) is mapped to the correction factor of the entire region of the taken image, and the taken image is corrected.

Japanese Laid-open Patent Publication No. 2008-79248 discloses that while the correction factor of the overlap region R is calculated by the same method as the technique disclosed in the Japanese Laid-open Patent Publication No. 2008-77595, the correction factor at the central position of the image taking region E is determined as 1. The correction factor of the region between the overlap region R and the center position of the image taking region E is interpolated based on the ratio of the distance between the overlap regions.

Specifically, as illustrated in FIG. 19, a pixel S exists in the image taking region E4 of the camera C4 other than the overlap region R. When the length of a line drawn from the pixel S onto the optical axis of the camera C is Lx, the length from the pixel S to the overlap region R1 is Ly, and the correction factor in the overlap region R1 is G, the correction factor G(S) in the pixel S is calculated by $G(S)=1+(G-1)(Lx/(Lx+Ly))$.

When the image taken by the camera C4 is corrected, for example, the correction factor of the overlap region R1 is determined as G(S1), and the correction factor of the overlap region R4 is determined as G(S2). As shown in FIG. 21, the correction factor from the left end of the image taking region E4 to a pixel S1 is G(S1) and constant, and the correction factor from the right end of the image taking region E4 to a pixel S2 is G(S2) and constant. The correction factor of a pixel S0 on the optical axis of the camera C4 is 1, and the correction factor between the pixel S1 and the pixel S0 and the correction factor between the pixel S2 and the pixel S0 are calculated based on the above formula.

SUMMARY

According to an aspect of the invention, an image synthesis apparatus includes an image obtainer which obtains a plurality of images taken by a plurality of cameras; a pixel value corrector which, with respect to each of the images, calculates, as a correction factor of an average pixel value in overlap regions located at the both ends of an image with an image region of an image taken by another camera among the plurality of cameras, a correction factor such that the average pixel value after correction in the overlap region and the average pixel value after correction in an overlap region, which is located in the image taken by the another camera overlapping the overlap region, correspond to each other, and, in the adjacent direction of the images, calculates the correction factor of a pixel value in a region other than the overlap regions by a predetermined continuous function connecting the correction factors in the overlap regions located at the both ends of the image and corrects the entire image based on the calculated correction factor; a synthetic image generator which synthesizes the images corrected by the pixel value corrector to generate one synthetic image; and an image output which outputs the synthetic image generated by the synthetic image generator to an external apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

DETAILED DESCRIPTION OF THE PREFERRED EMBODIMENTS

Figure 1:
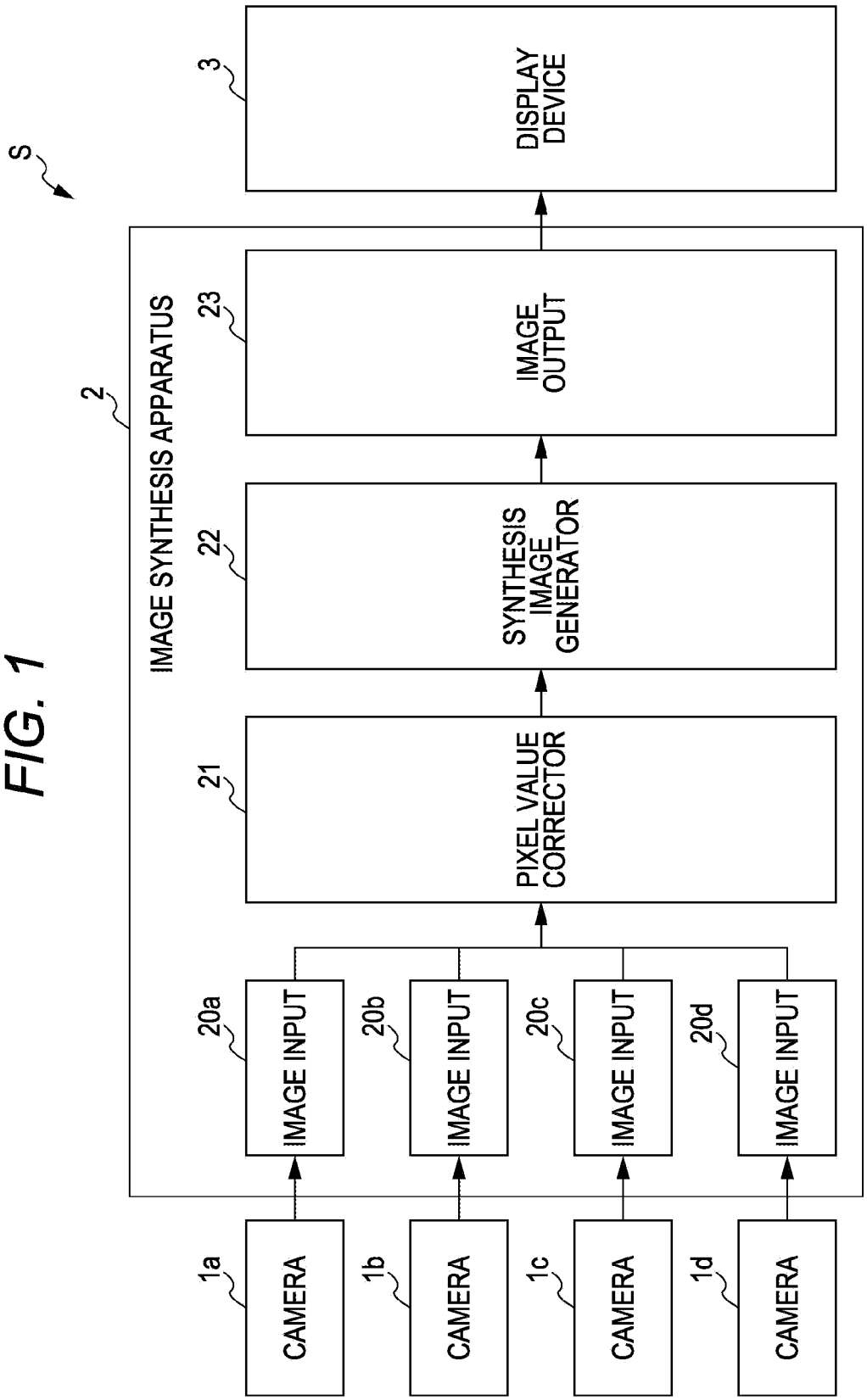
FIG. 1 is a view showing a constitution of an image display system according to a first embodiment.

Reference may now be made in detail to embodiments of the present invention, examples of which are illustrated in the accompanying drawings, wherein like reference numerals refer to like elements throughout.

When the difference of the brightness value between taken images is large, the taken images are synthesized by the above prior art technique, whereby there may be generated a synthetic image with unnatural feeling such that the joints b1 to b4 between each image are conspicuous, or nonexistent streaks are reflected.

Namely, in the Japanese Laid-open Patent Publication No. 2008-77595, the entire taken image is uniformly corrected by not the calculated correction factor of each of the overlap regions R but the average value based on the correction factor. Therefore, especially when the difference of the correction factor in each of the overlap regions R is large, the correction amount of each of the overlap regions R substantially deviates from the actually calculated correction amount, whereby the joints b1 to b4 may be conspicuous.

In the Japanese Laid-open Patent Publication No. 2008-79248, when the value of the correction factor of each of the overlap regions R substantially departs from 1, and, at the same time, when the difference of the correction factor of each of the overlap regions R is small, a stripe-like image may appear near the optical axis of the camera C. This is because the correction factor on the optical axis is always kept at 1.

Hereinafter, an embodiment according to an image synthesis apparatus and an image synthesis method of this invention will be described in detail with reference to the drawings.

First Embodiment

Figure 2:
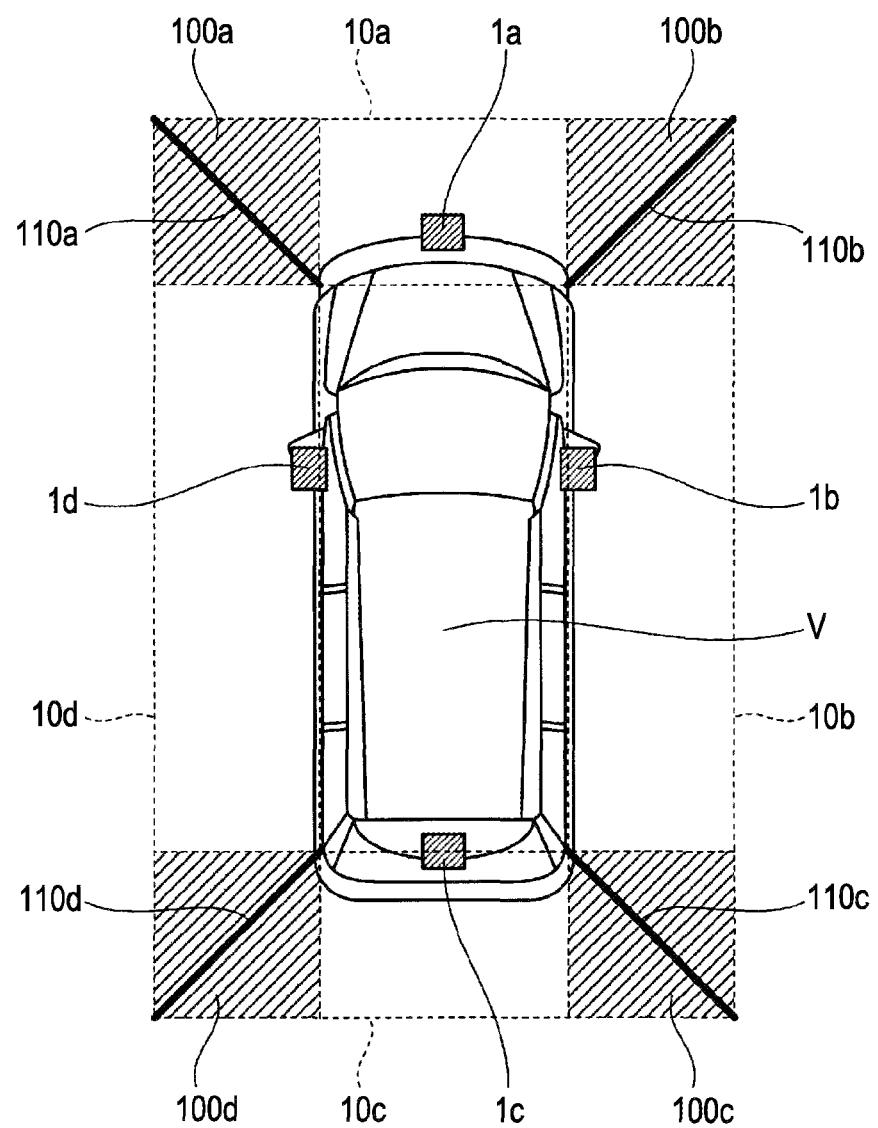
FIG. 2 is a view for explaining a mounting position and an image taking range of each camera in the image display system according to the first embodiment.

First, the outline of an image display system comprising an image synthesis apparatus according to the present embodiment will be described with reference to the drawings. FIG. 1 is a view showing a constitution of the image display system according to the first embodiment. FIG. 2 is a view for explaining a mounting position and an image taking range of each camera in the image display system according to the first embodiment. In the image synthesis apparatus of the present embodiment, images around a vehicle taken by a plurality of cameras mounted on the periphery of the vehicle are synthesized to be displayed. The image synthesis apparatus disclosed in this invention is not limited thereto, but can be applied to other cases in which the images taken by a plurality of cameras are synthesized to be generated as a synthetic image.

As shown in FIG. 1, an image display system S according to the present embodiment has a plurality of cameras 1a to 1d, an image synthesis apparatus 2, and a display device 3. In the present embodiment, the cameras 1a to 1d are respectively provided on the front, back, left, and right sides of a vehicle. Namely, as shown in FIG. 2, the camera 1a is mounted in front of a vehicle V, the camera 1b is mounted on the right side of the plan view of the vehicle V, the camera 1c is mounted behind the vehicle V, and the camera 1d is mounted on the left side of the plan view of the vehicle V. The camera 1a takes an image of the front of the vehicle V, the camera 1b takes an image of the right side of the plan view of the vehicle V, the camera 1c takes an image behind the vehicle V, and the camera 1d takes an image of the left side of the plan view of the vehicle V. In the present embodiment, a vehicle is exemplified as a mobile object, but it is not limited thereto.

The image synthesis apparatus 2 synthesizes the images taken by the cameras 1a to 1d to generate one synthetic image. The image synthesis apparatus 2 has a plurality of image inputs 20a to 20d, a pixel value corrector 21, a synthetic image generator 22, and an image output 23. The image inputs 20a to 20d correspond to an image obtainer and obtain the images taken by the cameras 1a to 1d. In the present embodiment, the images taken by the cameras 1a to 1d are moving images. The taken images are input to the image inputs 20a to 20d for each frame at a fixed frame rate.

The pixel value corrector 21 corrects the pixel value of each taken image obtained by the image inputs 20. The synthetic image generator 22 applies an image processing, such as viewpoint conversion processing, to the taken images corrected by the pixel value corrector 21 to thereafter synthesize the taken images. According to this constitution, a synthetic image is generated as the image around the vehicle V as if the driver's own vehicle V is viewed from directly above as shown in FIG. 2.

The viewpoint conversion processing is an image processing technique for converting an image taken by a real camera into an image taken by a virtual camera. Specifically, for example, the position, direction, field angle, and distortion of a lens of the real camera are used as parameters, there is calculated that a ray vector entering one pixel of the virtual camera corresponds to the ray vector entering which of pixels of the real camera through an arbitrary reference surface. This is calculated with respect to all pixels in the virtual camera, whereby the image taken by the actual camera is converted into the image taken by the virtual camera.

The image output 23 outputs the synthetic image generated by the synthetic image generator 22 to the display device 3. The image output 23 can output each taken image, input to the image input 20, as it is to the display device 3. The display device 3 is an in-vehicle display device and displays the image around the vehicle V output from the image synthesis apparatus 2.

Figure 3:
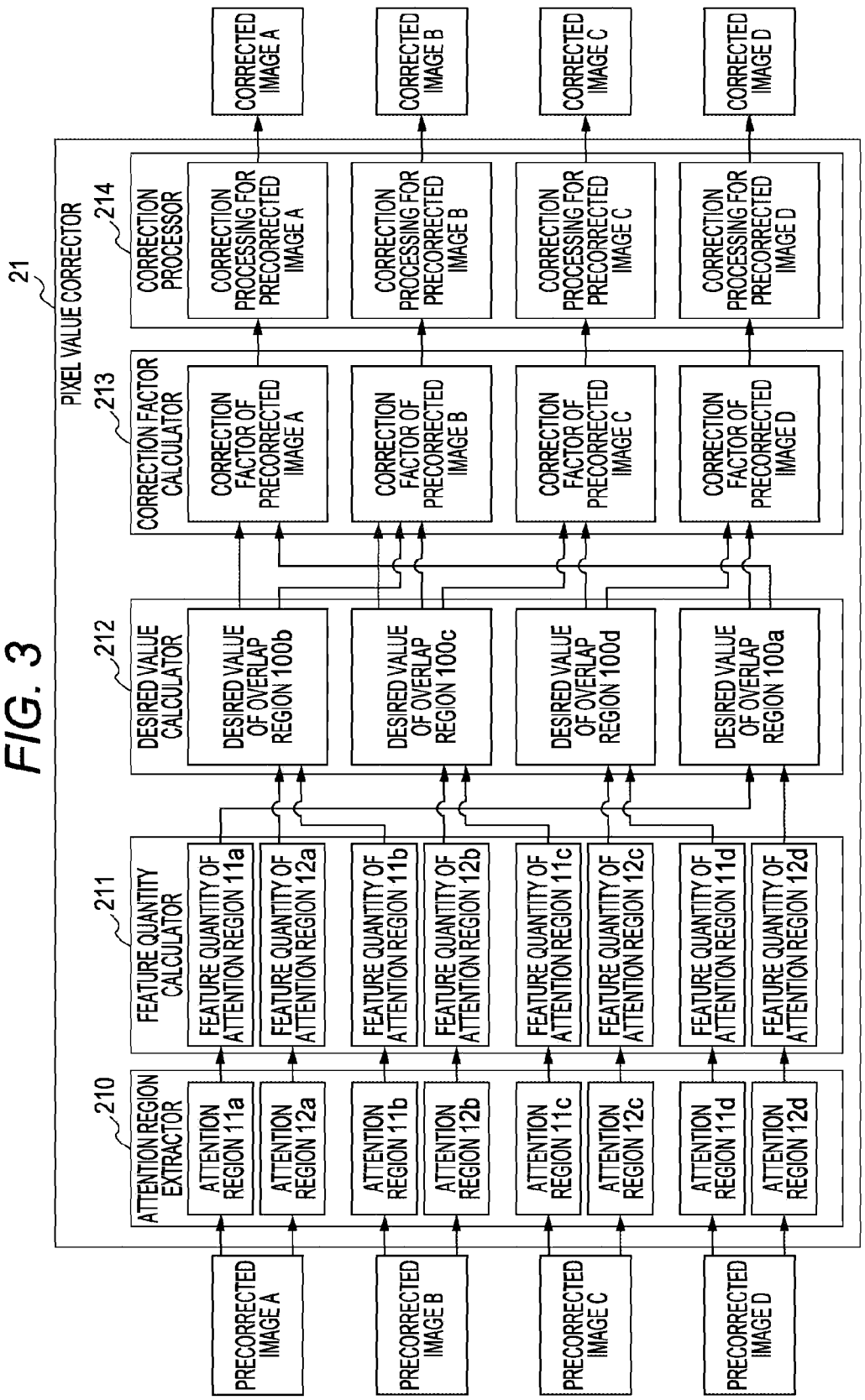
FIG. 3 is a view for explaining a constitution of a pixel value corrector and a pixel value correction processing according to the first embodiment.

Subsequently, a specific constitution of the pixel value corrector 21 and a pixel value correction processing will be described with reference to the drawings. FIG. 3 is a view for explaining the constitution of the pixel value corrector 21 and the pixel value correction processing according to the first embodiment.

As shown in FIG. 3, the pixel value corrector 21 according to the present embodiment has an attention region extractor 210, a feature quantity calculator 211, a desired value calculator 212, a correction factor calculator 213, and a correction processor 214.

The attention region extractor 210 extracts an attention region from an overlap region in an image region of each taken image. Regarding the image regions of the images taken by the cameras 1, the overlap region is a region overlapping the image region of the image taken by another camera 1. For example, as shown in FIG. 2, an image region 10a of an image taken by the camera 1a and an image region 10d of an image taken by the camera 1d overlap each other to form an overlap region 100a. In addition to the overlap region 100a, the image region 10a includes an overlap region 100b formed by overlapping an image region 10b of an image taken by the camera 1b.

Likewise, the image region 10b of the image taken by the camera 1b includes the overlap region 100b formed by overlapping the image region 10a and an overlap region 100c formed by overlapping an image region 10c of an image taken by the camera 1c. Further, the image region 10c includes the overlap region 100c formed by overlapping the image region 10b and the overlap region 100d formed by overlapping the image region 10d. Furthermore, the image region 10d includes the overlap region 100d formed by overlapping the image region 10c and the overlap region 100a formed by overlapping the image region 10a. Thus, in the present embodiment, each of the image regions 10a to 10d has, at the left and right ends, the overlap regions 100a to 100d formed by overlapping the image regions 10a to 10d of the images taken by the adjacent cameras 1.

The overlap regions 100 are predetermined in accordance with the mounting position of the cameras 1a to 1d to the vehicle V and an image taking range of each of the cameras 1a to 1d.

Figure 4:
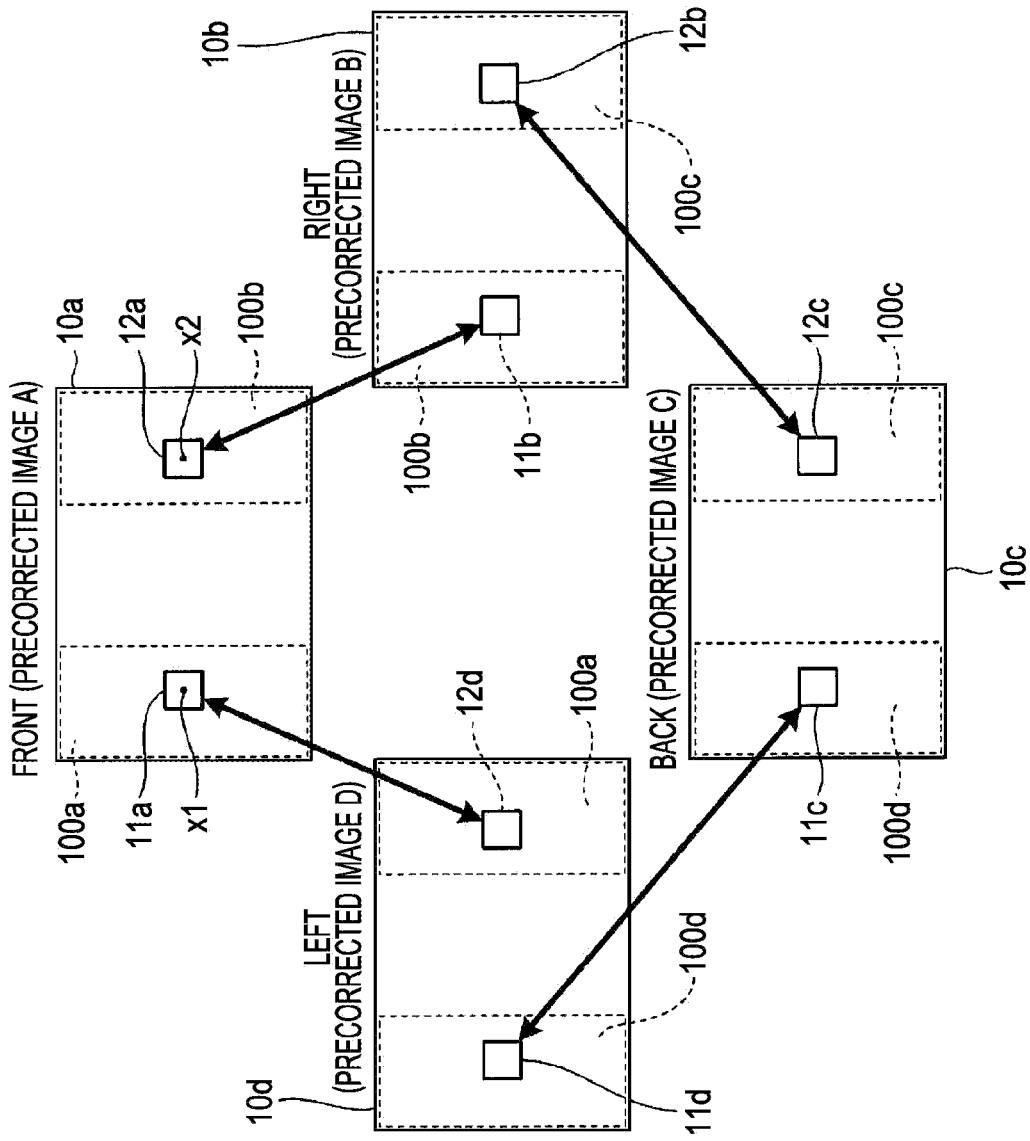
FIG. 4 is a view for explaining a correspondence relation between attention regions in precorrected images taken by cameras.

The attention region is a predetermined rectangular region in the overlap region 100. Here, the correspondence relation between the attention regions extracted from the image regions 10 of the taken images. In the following description, the images taken by the cameras 1a to 1d are respectively referred to as precorrected images A to D. FIG. 4 is a view for explaining the correspondence relation between the attention regions in the precorrected images A to D respectively taken by the cameras 1a to 1d.

As shown in FIG. 4, regarding the image region 10a of the precorrected image A, the attention region extractor 210 extracts an attention region 11a from the overlap region 100a, and, at the same time, extracts an attention region 12a from the overlap region 100b. Further, the attention region extractor 210 applies the same processing to the precorrected images B to D. According to this constitution, as shown in FIG. 3, attention regions 11b and 12b are extracted from the image region 10b of the precorrected image B, attention regions 11c and 12c are extracted from the image region 10c of the precorrected image C, and attention regions 11d and 12d are extracted from the image region 10d of the precorrected image D. Hereinafter, an arbitrary image region of the image regions 10a to 10d may be referred to as the image region 10, an arbitrary attention region of the attention regions 11a to 11d may be referred to as an attention region 11, and an arbitrary attention region of the attention regions 12a to 12d may be referred to as an attention region 12.

Incidentally, a super-wide-angle lens is used as a lens of each of the cameras 1a to 1d, and therefore, in the precorrected images A to D, the farther away from the center of the image, a subject is rendered with more distortion. Therefore, each of the overlap regions 100 is actually not the rectangular shape shown in FIG. 4 but a region distorted toward the center of the image. However, in the present embodiment, for ease of understanding, the overlap regions 100 have rectangular shapes.

Regarding the attention regions 11a to 11d and 12a to 12d extracted from the overlap regions 100 of each of the precorrected images A to D, images obtained by taking the same place by the cameras 1 are rendered in the two attention regions extracted from the same overlap region 100. For example, when a subject (for example, a vehicle) taken by the camera 1a exists in the attention region 11a of the overlap region 100a in the image region 10a, the same subject exists in the attention region 12d of the overlap region 100a in the image region 10d. Namely, in each of the precorrected images A to D, the two attention regions extracted from the same overlap region 100 overlap each other when the taken images after correction are synthesized by the synthetic image generator 22 to be described later.

The attention regions 11 and 12 are preferably extracted from a region lower than the center of the image region 10.

Namely, in either taken image, a road is often normally rendered in the region lower than the center of the image region 10, and therefore, the attention regions 11 and 12 are set in the region where the same subject is highly likely to exist in the all attention regions, whereby the correction processing can be performed with high accuracy.

The feature quantity calculator 211 calculates, with respect to the precorrected images A to D, an average pixel value as the feature quantity of the attention regions 11 and 12 in each of the overlap regions 100. In the present embodiment, the pixel value is a brightness value. Namely, the feature quantity calculator 211, as shown in FIG. 3, calculates the two average pixel values in the attention region for each of the precorrected images A to D.

The feature quantity calculator 211 may calculate not the average pixel value of the attention regions 11 and 12 but the average pixel value of the entire overlap region 100. According to this constitution, the average pixel value in the overlap region 100 can be calculated with more accuracy. In this case, the attention region extractor 210 is not required to be provided. However, as described above, since the overlap region 100 actually has a distorted shape, it may take a time to calculate the average pixel value. Thus, as in the present embodiment, the rectangular attention regions 11 and 12 are extracted from the overlap region 100 by the attention region extractor 210, and the average pixel value of the attention regions 11 and 12 is calculated by the feature quantity calculator 211, whereby a value approximating the average pixel value of the entire overlap region 100 can be easily calculated.

The desired value calculator 212 calculates a desired value (hereinafter referred to as "a desired pixel value") of the average pixel value after correction of the overlap region 100 including the two overlapped attention regions, based on the feature quantity (the average pixel value) of the attention regions 11 and 12 in each of the precorrected images A to D and the average pixel value of the attention regions 11 and 12 in the other precorrected images A to D overlapping the relevant attention regions 11 and 12. Namely, for example, the desired value calculator 212 calculates the desired pixel value of the overlap region 100a, based on the average pixel value of the attention region 11a in the overlap region 100a in the image region 10a and the average pixel value of the attention region 12d in the overlap region 100a in the image region 10d.

In the present embodiment, the desired value calculator 212 calculates the desired pixel value by calculating a weighted average value, considering the number of pixels in each attention region, in the average pixel value of the two attention regions overlapping each other. Namely, when the average pixel value of an attention region X is a(X), and the number of pixels in the attention region X is p(X), the desired pixel value in the overlap region 100a can be calculated as (a(11a)*p(11a)+a(12d)*p(12d))/(p(11a)+p(12d)).

When the numbers of pixels in the two overlapped attention regions are equal or substantially equal to each other, the desired value calculator 212 may simply calculate the desired pixel value as the average value of the average value pixel value of the two attention regions. Further, when the desired pixel value in the overlap region 100a is calculated, the desired value calculator 212 may give weight to the attention region of the specified camera 1 so that, for example, the desired pixel value approaches the average pixel value of the camera 1a provided in front of the vehicle V.

As described above, the desired value calculator 212 regards the weighted average value (or the average value) of the average pixel value of the two overlapped attention regions as the desired pixel value of the overlap region 100 including the two attention regions. Then, as described later, the correction processor 214 performs correction so that the pixel value of the overlap region of each of the precorrected images A to D corresponds to the desired pixel value. Therefore, in each of the precorrected images A to D, the pixel values after correction of the overlap regions 100 overlapping each other can be corresponded to each other, and, after image synthesis, joints 110a to 110d (see, FIG. 2) between the taken images can be rendered inconspicuous.

Figure 5:
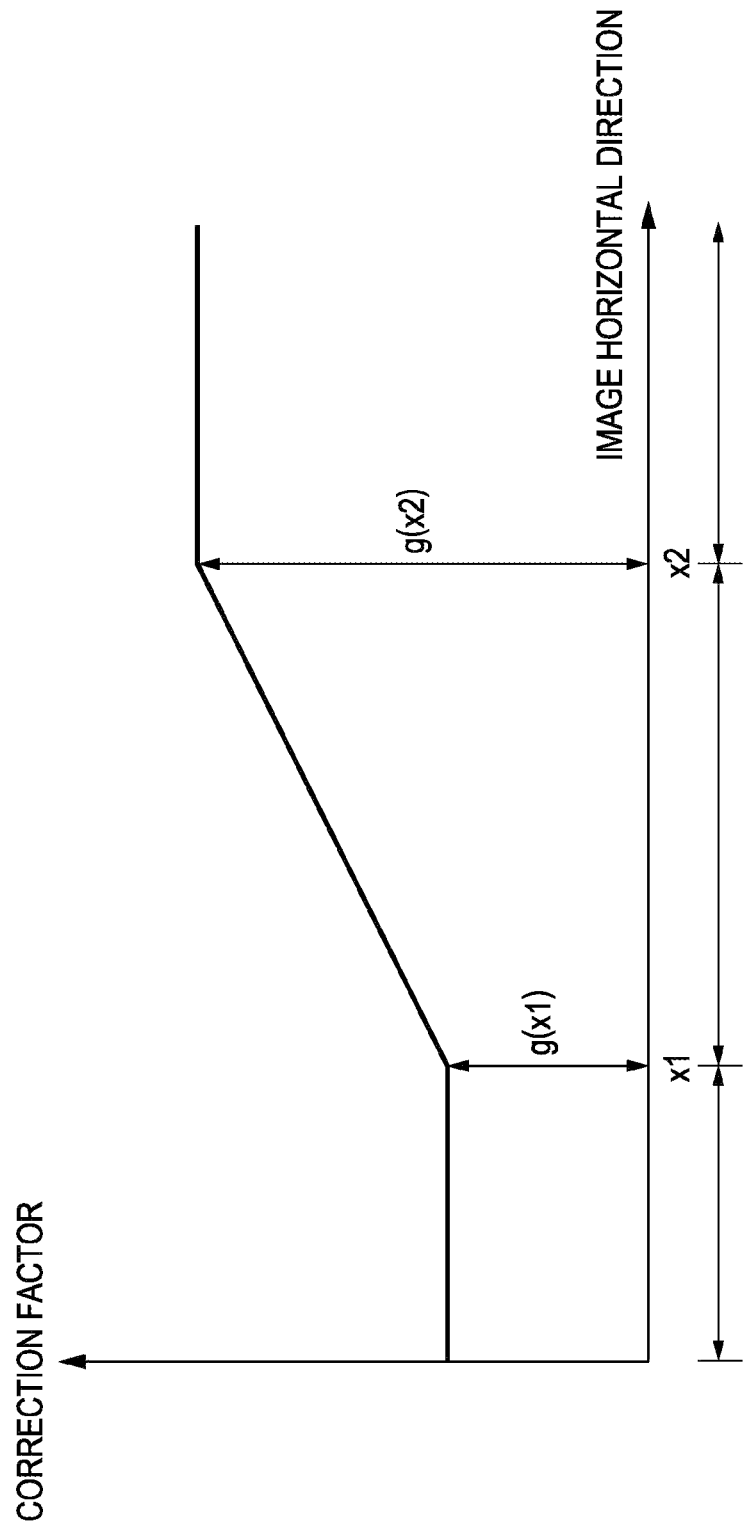
FIG. 5 is a graph showing an example of a relationship between an image horizontal position and a correction factor determined by a correction factor calculator according to the first embodiment.

The correction factor calculator 213 calculates, with regard to the precorrected images A to D, the correction factor in the image horizontal direction of the precorrected images A to D, based on the average pixel value of the two attention regions 11 and 12 existing in the image region 10 and the desired pixel value of the overlap regions 100 respectively including the attention regions 11 and 12. Hereinafter, a correction factor calculation processing performed by the correction factor calculator 213 will be specifically described. FIG. 5 is a graph showing an example of a relationship between an image horizontal position and the correction factor determined by the correction factor calculator 213 according to the first embodiment. Hereinafter, the processing for one precorrected image will be described.

First, the correction factor calculator 213 extracts, as a representative point, one pixel respectively from the two attention regions 11 and 12 in the image region 10. For example, the correction factor calculator 213, as shown in FIG. 4, extracts, as the representative points in the two attention regions 11a and 12a in the image region 10a of the precorrected image A, a pixel x1 in the attention region 11a and a pixel x2 in the attention region 12a. In the present embodiment, the correction factor calculator 213 extracts, as the representative point, an arbitrary point of a pixel at the horizontal center of the attention region.

Subsequently, the correction factor calculator 213 calculates the correction factors at the respective extracted representative points. Specifically, the correction factor calculator 213 calculates a correction factor g(x) at a representative point x by t(X)/a(X), wherein a(X) is the average pixel value in an attention region X to which the representative point x belongs, and t(X) is the desired pixel value of the overlap region 100 to which the attention region X belongs. For example, the correction factor at the representative point x1 is g(x1)=t(11a)/a(11a), and the correction factor at the representative point x2 is g(x2)=t(12a)/a(12a). According to this constitution, a correction factor g(x1) at the representative point x1 and a correction factor g(x2) at the representative point x2 in FIG. 5 are calculated.

Subsequently, the correction factor calculator 213 keeps the correction factor from the end of the precorrected image to the representative point at the closest position to the end in the image horizontal direction constant at the correction factor at the representative point. For example, as shown in FIG. 5, the correction factor calculator 213 keeps the correction factor from the left end of the precorrected image A to the representative point x1 constant at the correction factor g(x1) at the representative point x1, and likewise the correction factor calculator 213 keeps the correction factor from the right end of the precorrected image A to the representative point x2 constant at the correction factor g(x1) at the representative point x2. Namely, the correction factor of the precorrected image A at the image horizontal position 0≦x≦x1 is g(x)=g(x1), and the correction factor of the precorrected image A at x2≦x≦the right end of the image is g(x)=g(x2).

As described above, the image synthesis apparatus 2 according to the present embodiment is different from the prior art synthetic image, and no deviation occurs between the desired pixel value of the overlap region 100 and the actual pixel value after correction, whereby the joints between the taken images are not unnatural in the generated synthetic image.

The correction factor calculator 213 then calculates the correction factor between the two representative points by a predetermined continuous function connecting the correction factors at the representative points. Namely, the correction factor calculator 213 interpolates an interval of x1<x<x2 in FIG. 5 with a continuous function f(x) connecting the correction factor g(x1) at the representative point x1 and the correction factor g(x2) at the representative point x2. More specifically, the correction factor calculator 213 calculates the correction factor of x1<x<x2 by f(x)=(g(x2)−g(x1))(x−x1)/(x2−x1)+g(x1). The continuous function f(x) may be a function passing through the correction factor at each representative point, and may be a continuous curve that does not exceed a range of the minimum and maximum values of g(x1) and g(x2) in the interval of x1<x<x2.

As described above, the image synthesis apparatus 2 according to the present embodiment supplements the correction value between the representative points in the image horizontal direction with the continuous function passing through the correction factor of each representative point. According to this constitution, as described later, when the taken image is corrected by the correction processor 214, the correction factor is not rapidly changed in the image horizontal direction, and the taken image can be made to a further natural corrected image free from unnatural feeling.

Namely, the image synthesis apparatus 2 according to the present embodiment can generate a synthetic image free from unnatural feeling, which is different from the prior art synthetic image and has no stripe-like image near the center of the image region 10.

In the present embodiment, although the representative point extracted from each of the attention regions 11 and 12 is an arbitrary point of the pixel at the horizontal center of the attention region, it is not limited to this position. For example, the representative point in the attention region located more to the left side than the center of the image region 10 may be a point at the right end of the attention region, and the representative point in the attention region located more to the right side than the center of the image region 10 may be a point at the left end of the attention region. When the attention region has a polygonal shape or an asymmetric shape, a pixel in the horizontal position where the numbers of left and right pixels are equal to each other or a pixel at the center side end in the image horizontal direction may be extracted as the representative point. The position of the representative point is determined as the position in the attention region closer to the center of the image region 10, whereby the pixel values in the two overlapped overlap regions 100 can be further uniformed.

The correction processor 214 corrects the pixel value of each pixel of each of the precorrected images A to D on the basis of the correction factor calculated by the correction factor calculator 213 and corresponding to each pixel. Specifically, the correction processor 214 multiplies the correction factor at each image horizontal position calculated by the correction factor calculator 213 by the pixel value of each pixel existing in an image vertical direction at the image horizontal position to thereby correct the pixel value in the entire region of the taken image.

At that time, the average pixel value of the attention regions 11 and 12 after correction is equal to or satisfactorily approaches the desired pixel value of the overlap region 100 including the attention regions 11 and 12, and therefore, the difference of joints 110a to 110d of a synthesized image can be satisfactorily reduced. For example, in the precorrected image A, the attention region 11a is extracted from a region including the right end of the overlap region 100a, and, at the same time, the attention region 12a is extracted from a region including the left end of the overlap region 100b. Further, the representative point x1 is extracted from the right end of the attention region 11a, and, at the same time, the representative point x2 is extracted from the left end of the attention region 11b. The average pixel value of the overlap region 100a in the image region 10a of a corrected image A is then equal to the average pixel value of the overlap region 100a in the image region 10d of a corrected image D.

Figure 6:
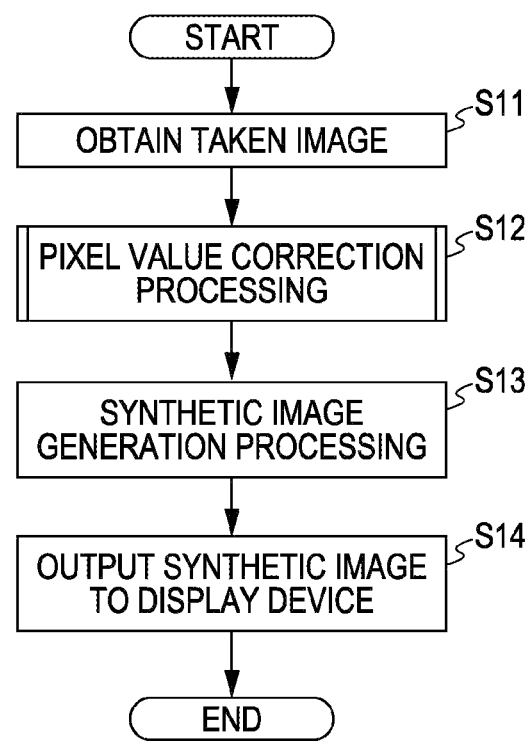
FIG. 6 is a flow chart showing an example of a processing procedure executed by an image synthesis apparatus according to the first embodiment.

Next, a specific operation of the image synthesis apparatus 2 according to the present embodiment will be described by using the drawings. FIG. 6 is a flow chart showing an example of a processing procedure executed by the image synthesis apparatus 2 according to the first embodiment. Regarding the processing procedure executed by the image synthesis apparatus 2, FIG. 6 shows only the processing procedure relevant to the synthesis of the images taken by the cameras 1a to 1d.

As shown in FIG. 6, the pixel value corrector 21 of the image synthesis apparatus 2 obtains the images taken by the cameras 1a to 1d and input to the image inputs 20a to 20d (operation S11) and applies the pixel value correction processing to the obtained taken images (operation S12). The pixel value correction processing will be described later in detail.

When the pixel value correction processing in operation S12 is terminated, the synthetic image generator 22 performs a synthetic image generation processing (operation S13). In the synthetic image generation processing, the viewpoint conversion processing is applied to the taken images corrected in operation S12, and thereafter, the taken images are synthesized, whereby a synthetic image is generated as if the vehicle V is viewed from above. The synthetic image generator 22 then outputs the generated synthetic image to the display device 3 through the image output 23 (operation S14). The processing from operation S11 to S14 is performed for each input of the taken image of one frame to the image input 20 at a constant frame rate. According to this constitution, there is no blind spot from a driver's seat, and in addition, the positional relation between the situation around the driver's own vehicle and the driver's own vehicle can be easily grasped, whereby a driver of the vehicle V can easily put the vehicle in the garage.

Figure 7:
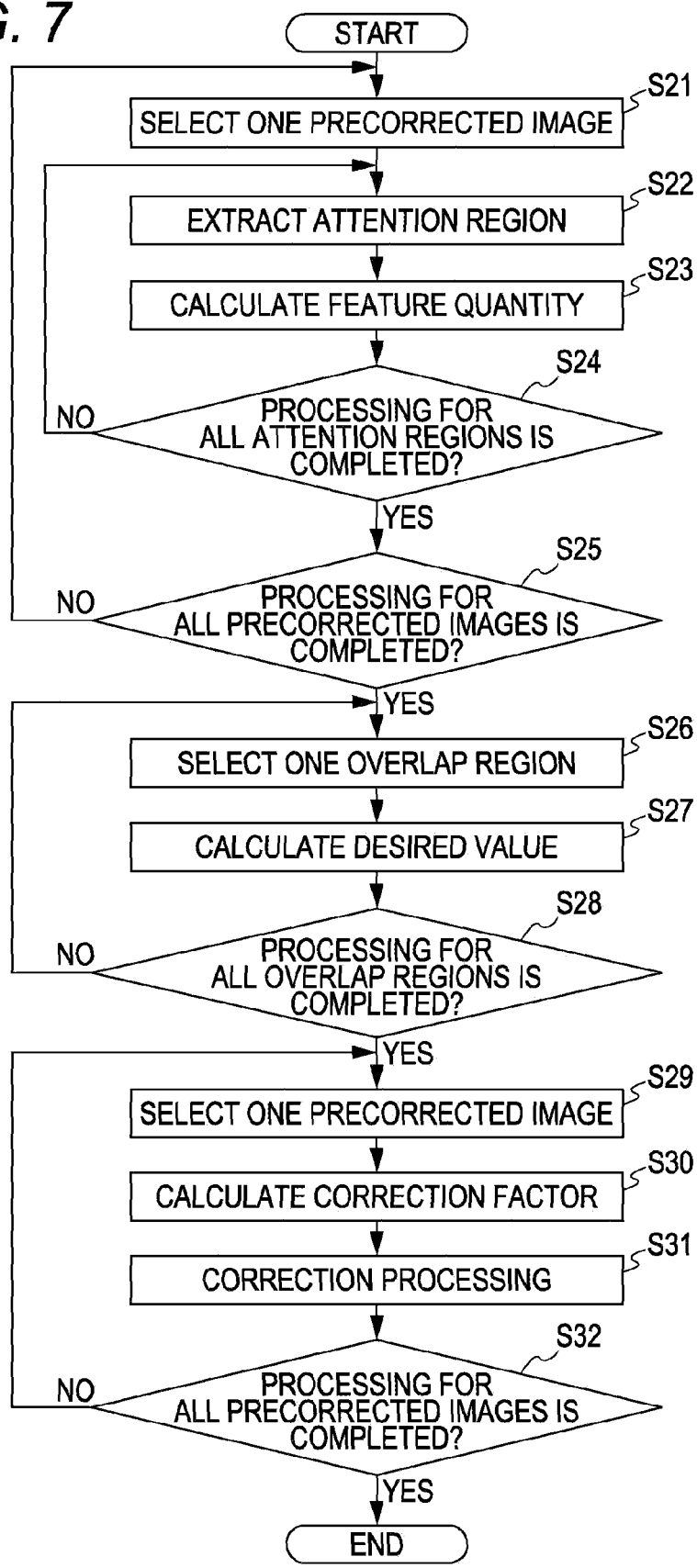
FIG. 7 is a flow chart showing an example of a processing procedure of the pixel value correction processing according to the first embodiment.

Subsequently, the pixel value correction processing in operation S12 will be specifically described by using FIG. 7. FIG. 7 is a flow chart showing an example of the processing procedure of the pixel value correction processing according to the first embodiment.

As shown in FIG. 7, when the pixel value correction processing is started, the pixel value corrector 21 selects one precorrected image from the precorrected images A to D obtained from the image inputs 20a to 20d (operation S21). The attention region extractor 210 then extracts the attention regions 11 and 12 from the two overlap regions 100 in the image region 10 of the selected precorrected image (operation S22). The feature quantity calculator 211 then calculates the average pixel value of the two attention regions 11 and 12, extracted in operation S22, as the feature quantity of the attention regions 11 and 12 (operation S23).

Subsequently, the pixel value corrector 21 determines whether or not the feature quantities of all the attention regions 11 and 12 (in the present embodiment, two attention regions) are calculated (operation S24). In the processing, when the processing for all the attention regions 11 and 12 is not completed (operation S24 is No), the pixel value corrector 21 shifts the processing to operation S22. Meanwhile, when it is determined that the processing for all the attention regions 11 and 12 is completed (operation S24 is Yes), the pixel value corrector 21 shifts the processing to operation S25.

In operation S25, the pixel value corrector 21 determines whether or not the processing from operations S22 to S24 is applied to all the precorrected images. In the processing, when the processing is not applied to all the precorrected images (operation S25 is No), the pixel value corrector 21 shifts the processing to operation S21. Meanwhile, when it is determined that the processing of operations S22 to S24 for all the precorrected images is completed (operation S25 is Yes), the pixel value corrector 21 shifts the processing to operation S26.

In operation S26, the pixel value corrector 21 selects one overlap region 100 from the overlap regions 100a to 100d. Next, the desired value calculator 212 calculates the desired value of the average pixel value after correction of the selected overlap region 100 (operation S27). Specifically, when the overlap region 100a is selected in operation S26, the desired value calculator 212 calculates, as the desired value, the weighted average value between the average pixel value of the attention region 11a extracted from the overlap region 100a of the precorrected image A and the average pixel value of the attention region 12d extracted from the overlap region 100a of the precorrected image D.

When the processing of operation S27 is terminated, the pixel value corrector 21 determines whether or not the processing of operations S26 and S27 is applied to all the overlap regions 100a to 100d. In the processing, when the processing of operations S26 and S27 is not applied to all the overlap regions 100a to 100d (operation S28 is No), the pixel value corrector 21 shifts the processing to operation S26. Meanwhile, when it is determined that the processing of operations S26 and S27 for all the overlap regions 100a to 100d is completed (operation S28 is Yes), the pixel value corrector 21 shifts the processing to operation S29.

In operation S29, the pixel value corrector 21 selects one precorrected image from the precorrected images A to D. Next, the correction factor calculator 213 calculates the correction factor of the selected precorrected image (operations S30). Specifically, the correction factor calculator 213 calculates the correction factor in the image horizontal direction based on the average pixel value of the two attention regions 11 and 12 existing in the image region 10 of the precorrected image selected in operation S29 and the desired pixel value of the overlap region 100 including the attention regions 11 and 12.

More specifically, the correction factor calculator 213 first calculates the correction factor at the representative point in each of the attention regions 11 and 12. The correction factor calculator 213 then keeps, in the image horizontal direction, the correction factor from the end of the image to the representative point at the closest position to the end constant at the correction factor at the representative point, and further supplements the correction value between the representative points with the continuous function passing through the correction factor at each representative point. According to this constitution, the correction factor calculator 213 determines the correction factor of the entire region of the precorrected image.

When the processing of operation S30 is terminated, the correction processor 214 performs correction processing for the precorrected image selected in operation S29. Specifically, the correction processor 214 multiplies the correction factor at each image horizontal position calculated in operation S30 by the pixel value of each pixel existing in the image vertical direction at the relevant position to thereby correct the pixel value in the entire region of the taken image.

When the processing of operation S31 is terminated, the pixel value corrector 21 determines whether or not the processing of operations S30 and S31 is applied to all the precorrected images A to D (operation S32). In the processing, when the processing of operations S30 and S31 is not applied to all the precorrected images A to D (operation S32 is No), the pixel value corrector 21 shifts the processing to operation S29. Meanwhile, when it is determined that the processing for all the precorrected images A to D is completed (operation S32 is Yes), the pixel value corrector 21 terminates the pixel value correction processing.

In the present embodiment, although the correction processing for the brightness value has been described, a similar processing is applied to chromaticity. Thereby, the difference of the chromaticity in the overlap region 100 can be reduced. The chromaticity may be calculated independent from the calculation of the brightness value, or the correction factor of the brightness value calculated by the correction factor calculator 213 may be used as the correction factor of the chromaticity. When the correction factor of the brightness value is applied to the correction factor of the chromaticity, the correction factor of the brightness value may be applied as it is, or may be normalized or weighted.

When the taken image of the next frame is input during the correction processing, the correction factor calculated based on the relevant taken image is used in the taken image of the latest frame.

As described above, according to the image synthesis apparatus 2 of the first embodiment, even if the brightness or chromaticity is different between the images taken by each of the cameras 1 due to automatic adjustment conditions of each camera or picture-taking conditions, the joints 110a to 110d between the taken images can be smoothly connected, and therefore, an image easily viewable to a driver can be provided. The regions other than the overlap regions 100 (non-overlap region) are also corrected by being changed in a stepwise manner so that the correction factors of the left and right overlap regions are connected, and therefore, even if the difference of the pixel values, such as brightness or chromaticity, between the adjacent taken images is large, the synthetic image free from unnatural feeling can be obtained.

Figure 8:
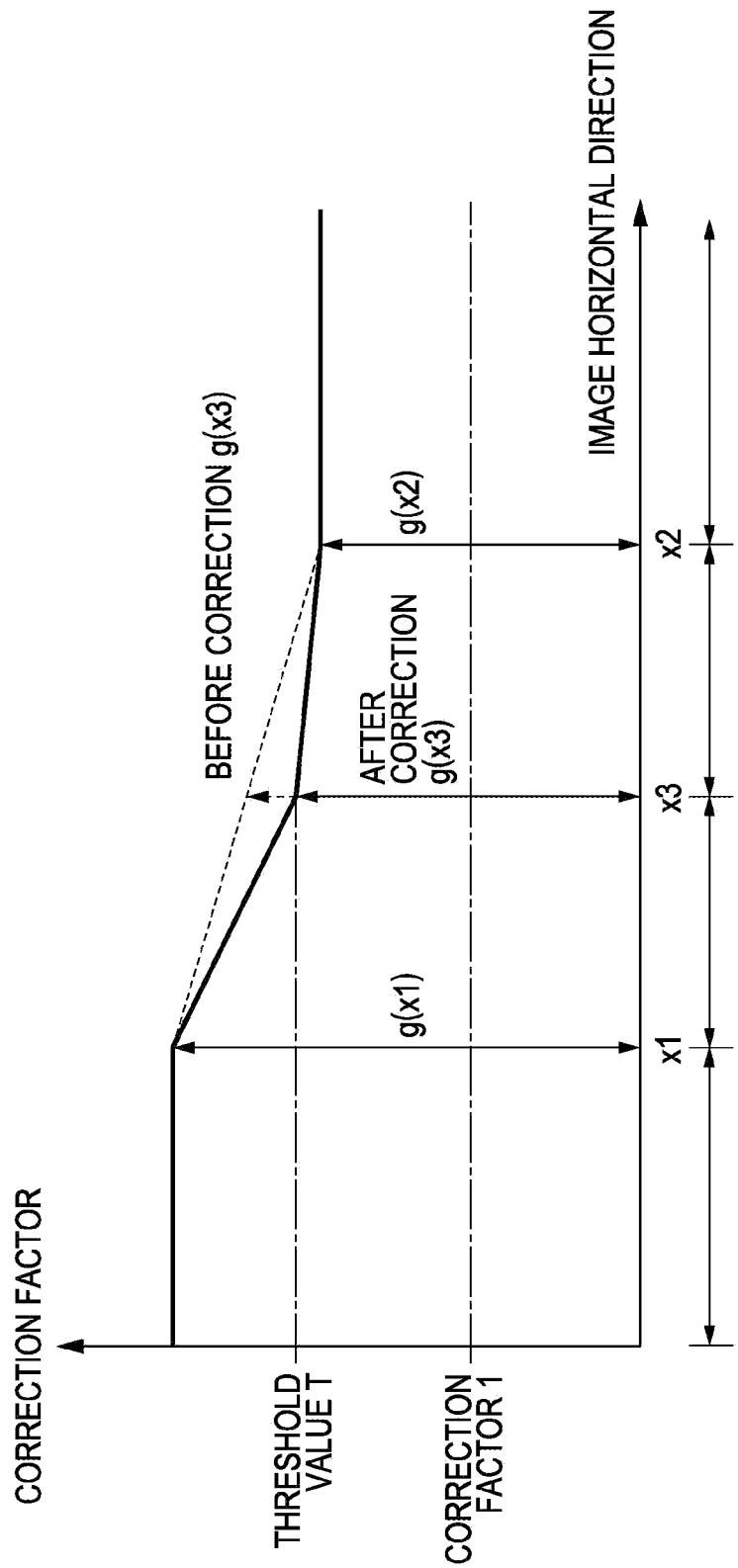
FIG. 8 is a graph showing an example of the relationship between the image horizontal position and the correction factor after modification of the correction factor with a threshold value.

The correction factor calculated in the correction factor calculation substantially exceeds 1 as a whole, in order to prevent the entire taken image from becoming excessively bright after correction. The correction factors of regions other than the overlap regions 100 may be modified by using a predetermined threshold value. Hereinafter, such a case will be described with reference to FIG. 8. FIG. 8 is a graph showing an example of the relationship between the image horizontal position and the correction factor after the modification of the correction factor with the threshold value.

In the above case, when the correction value at a predetermined position between the representative points is more than a predetermined threshold value in the horizontal direction of the image region 10, the correction factor calculator 213 modifies the correction factor at the predetermined position to the value of the threshold value. The correction factor calculator 213 then calculates the correction factor between the predetermined position and each representative point by a predetermined continuous function connecting the correction factor at the predetermined position and the correction factor at each representative point.

Specifically, as shown in FIG. 8, when the correction factors at the two representative points x1 and x2 are not less than 2 after the calculation of the correction factor of the precorrected image A, the correction factor calculator 213 compares a correction factor $g(x3)$ at a center x3 of the image region 10a with a threshold value T of the predetermined correction factor. When $g(x3)>T$, the correction factor calculator 213 modifies the correction factor at x3 to $g(x3)=T$. Further, the correction factor calculator 213 supplements an interval $x1<x<x3$ and an interval $x3<x<x2$ with the continuous function passing through $g(x1)$ and $g(x3)$ and the continuous function passing through $g(x2)$ and $g(x3)$. The threshold value T is predetermined based on the maximum value of the correction factor that can be taken by the image synthesis apparatus 2.

Also, when the correction factor calculated in the correction factor calculation processing is substantially entirely less than 1 as a whole, the correction factor calculator 213 can perform the above modification processing in order to prevent the entire taken image after correction from becoming excessively dark.

Figure 9:
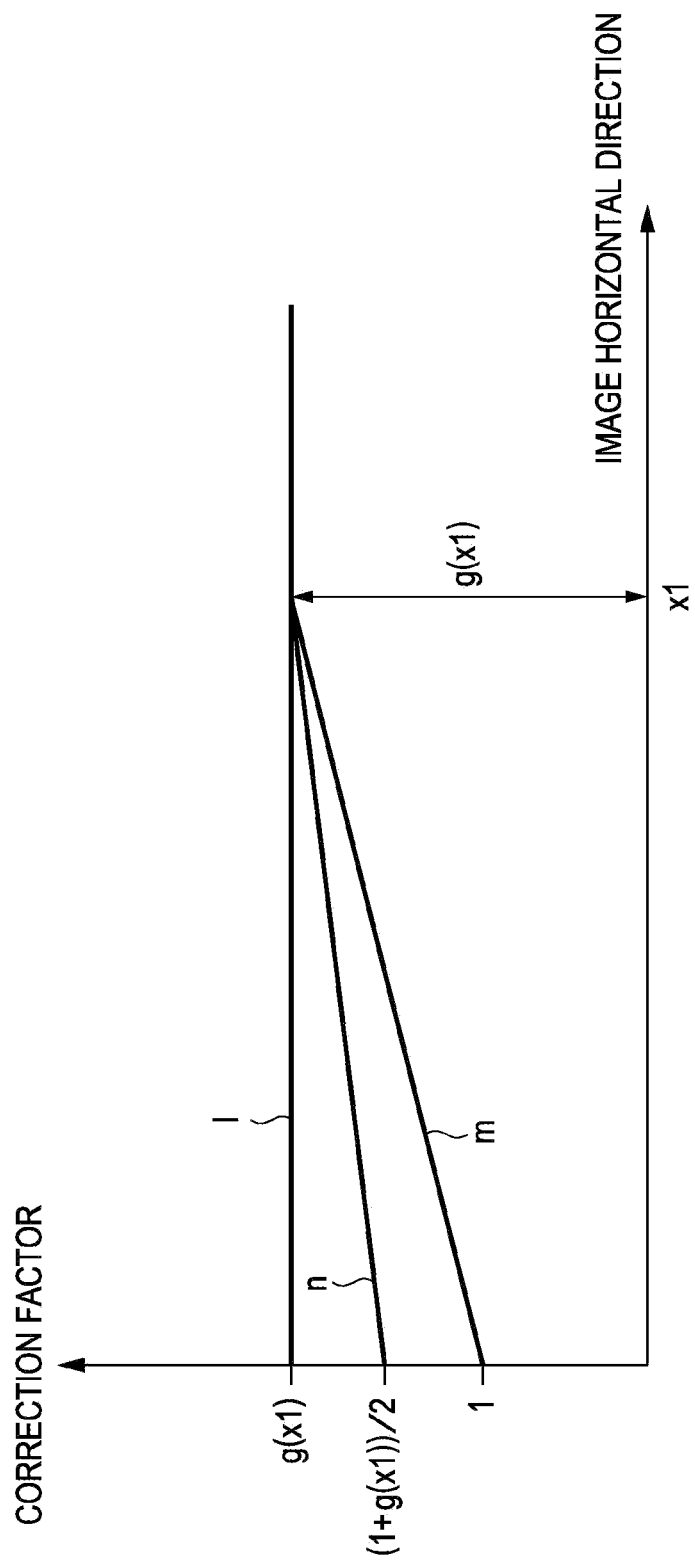
FIG. 9 is a view for explaining a method for calculating the correction factor when there is only one overlap region.

The image synthesis apparatus 2 according to the present embodiment can generate a synthetic image such that the vehicle V is looked down from above from the images taken by the four cameras 1a to 1d; however, the synthetic image can be generated by using two or three cameras 1. In that case, the image region 10 of each taken image may have only one overlap region 100 formed by the relevant image region 10 and another image region 10. Hereinafter, a method for calculating the correction factor in that case will be described by using FIG. 9. FIG. 9 is a view for explaining the method for calculating the correction factor when there is only one overlap region 100.

In the above case, the correction factor calculator 213 keeps the correction factor in the entire image region 10d constant at x1 in the interval of $0<x<x1$, like a line l. The correction factor calculator 213 may previously determine a constant as $g(0)=c$ and may interpolate linearly the correction factor in the interval of $0<x<x1$ like a line m. Especially, $c=1$, whereby the correction processing can be performed so that the pixel value before correction is not changed when $x=0$. Further, like a line n, after the value of $g(0)$ is calculated based on $g(x1)$, the correction factor may be determined by a function linearly interpolating the interval of $0<x<x1$. For example, the line n is $g(0)=(1+g(x1))/2$.

Second Embodiment

In each taken image, a region close to the camera 1 (the lower portion of the image region 10) and a region far from the camera 1 (the upper portion of the image region 10) may be substantially different in the pixel value. For example, when a road surface is shown in the lower portion of the image region 10, and the sky is shown in the upper portion of the image region 10, their pixel values are highly likely to be substantially different from each other. In that case, if the pixel value of the entire image region 10 is corrected by the correction factor considering only the image horizontal direction as in the first embodiment, the region where the sky is shown may be corrected to be excessively bright, or the region where the road surface is shown may be corrected to be excessively dark. Thus, in the second embodiment, the correction factor is calculated considering the image vertical direction in addition to the image horizontal direction.

Figure 10:
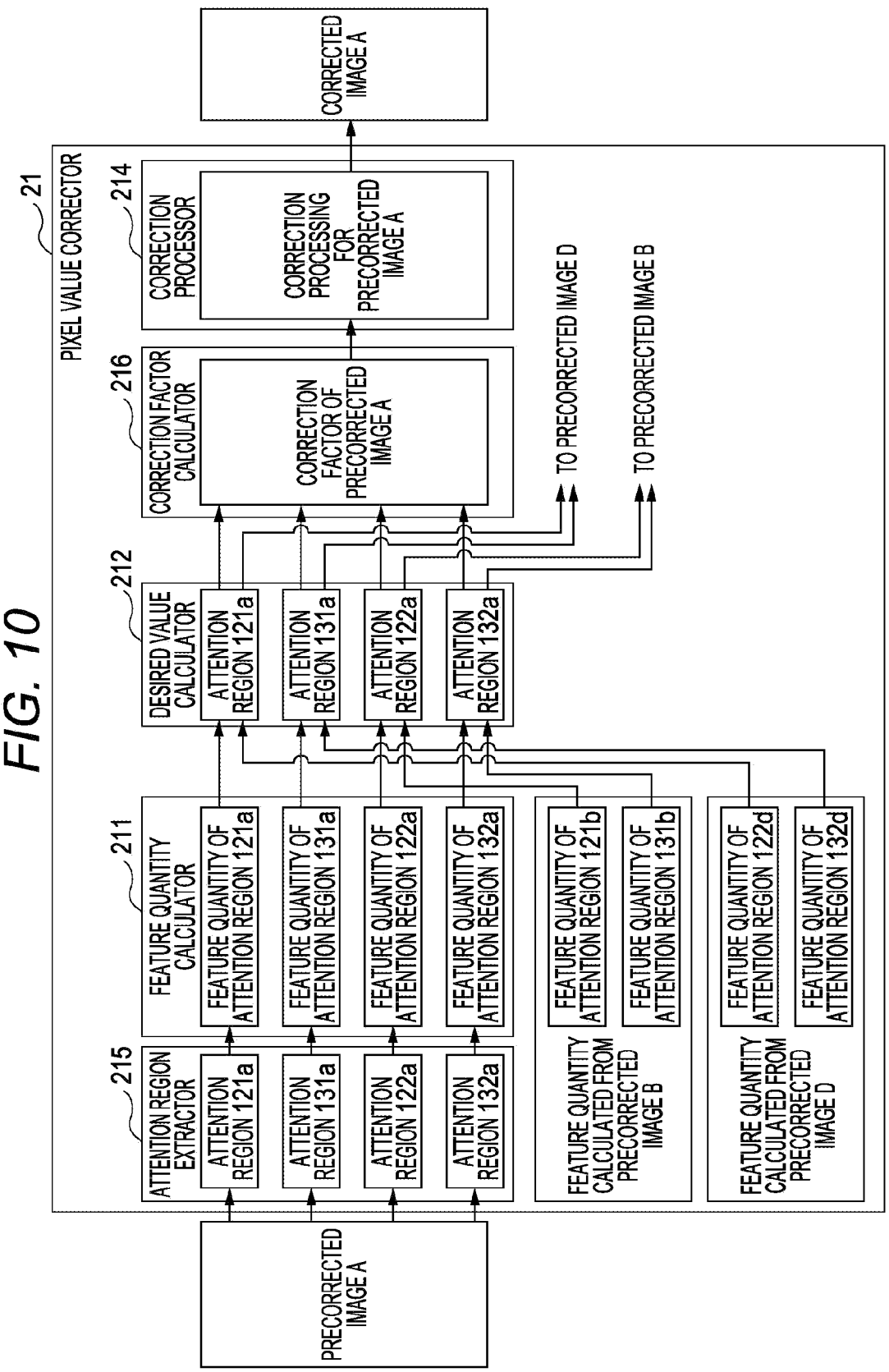
FIG. 10 is a view for explaining a constitution of the pixel value corrector and the pixel value correction processing according to the second embodiment.
Figure 11:
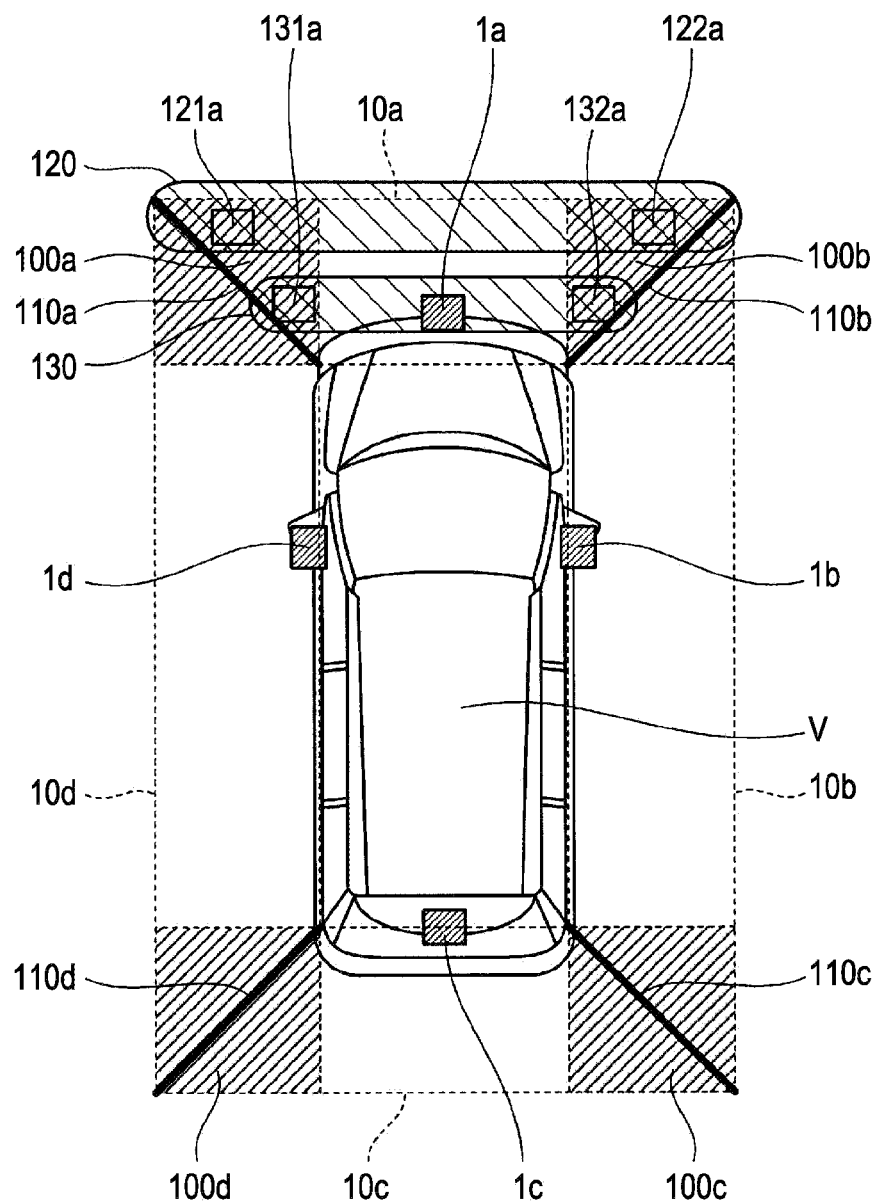
FIG. 11 is a view for explaining a position of the attention region according to the second embodiment.

Hereinafter, an image display system according to the second embodiment will be described with reference to the drawings. FIG. 10 is a view for explaining a constitution of a pixel value corrector and a pixel value correction processing according to the second embodiment. FIG. 11 is a view for explaining the positions of attention regions according to the second embodiment. The already described components are denoted by the same reference numerals, and the description will be omitted. FIG. 10 shows only the processing for the precorrected image A.

As shown in FIG. 10, an attention region extractor 215 of the image synthesis apparatus 2 according to the present embodiment extracts four attention regions (for example, attention regions 121a, 122a, 131a, and 132a) from each of the image regions 10. Specifically, the attention region extractor 215 extracts the attention region one by one from the regions corresponding to the upper and lower regions of the image region 10 in each of the two overlap regions 100 existing in one image region 10.

Namely, in the present embodiment, as shown in FIG. 11, in the image region 10a, an upper region 120 is provided in a region far from the camera 1a, and a lower region 130 is provided in a region close to the camera 1a. The upper and lower regions are provided in other image regions 10b to 10d in a similar manner (not shown).

For example, in the overlap region 100a of the image region 10a, the attention region extractor 215 extracts the attention region 121a from a region included in the upper region 120 of the image region 10a and extracts the attention region 131a from a region included in the lower region 130. Likewise, in the overlap region 100b of the image region 10a, the attention region extractor 215 extracts the attention region 122a from a region included in the upper region 120 of the image region 10a and the attention region 132a from a region included in the lower region 130.

Figure 12:
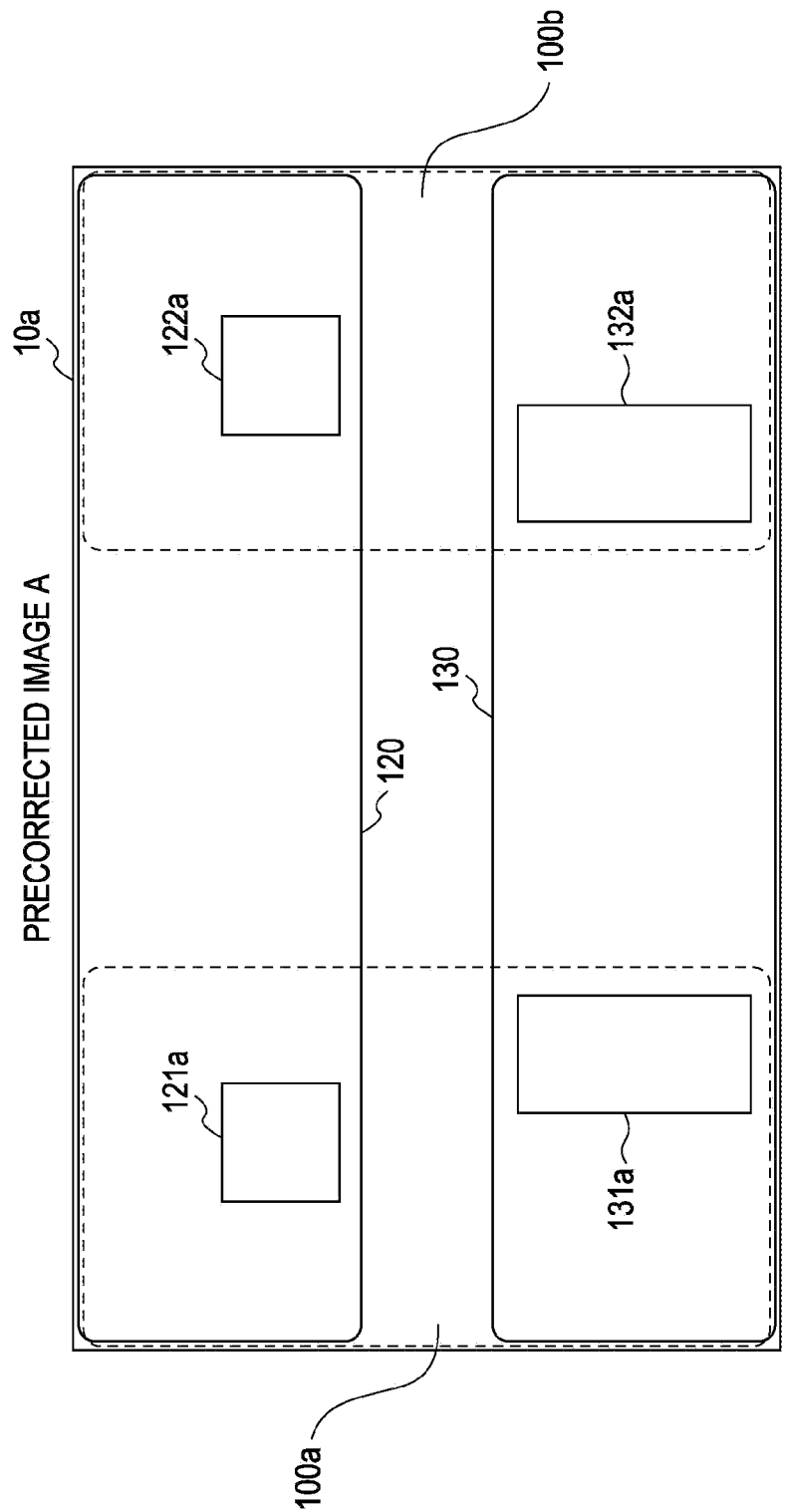
FIG. 12 is a view showing a positional relation between each region in a precorrected image A according to the second embodiment.

FIG. 12 shows a positional relation between each region in the precorrected image A. As shown in FIG. 12, the upper region 120 is located in the upper portion of the image region 10a, and the lower region 130 is located in the lower portion of the image region 10a. The attention region 121a is in a region where the overlap region 100a and the upper region 120 overlap each other, and the attention region 122a is in a region where the overlap region 100b and the upper region 120 overlap each other. Likewise, the attention region 131a is in a region where the overlap region 100a and the lower region 130 overlap each other, and the attention region 132a is in a region where the overlap region 100b and the lower region 130 overlap each other. In the present embodiment, the upper region 120 is located more in the upper portion than the center in the vertical direction of the image region 10, and the lower region 130 is located more in the lower portion than the center in the vertical direction of the image region 10.

Here, the attention region 121a overlaps an attention region 122d (not shown) extracted from the overlap region 100a of the image region 10d, and the attention region 122a overlaps an attention region 121b (not shown) extracted from the overlap region 100b of the image region 10b. The attention region 131a overlaps an attention region 132d (not shown) extracted from the overlap region 100a of the image region 10d, and the attention region 132a overlaps an attention region 131b (not shown) extracted from the overlap region 100b of the image region image region 10b.

The feature quantity calculator 211 calculates the average pixel value of each attention region as the feature quantity as in the first embodiment. Further, as in the first embodiment, based on the average pixel value of the attention regions and the average pixel value of the other attention regions overlapping the relevant attention regions, the desired value calculator 212 calculates the desired pixel value which is a desired value of the average pixel value after correction in these attention regions.

Figure 13:
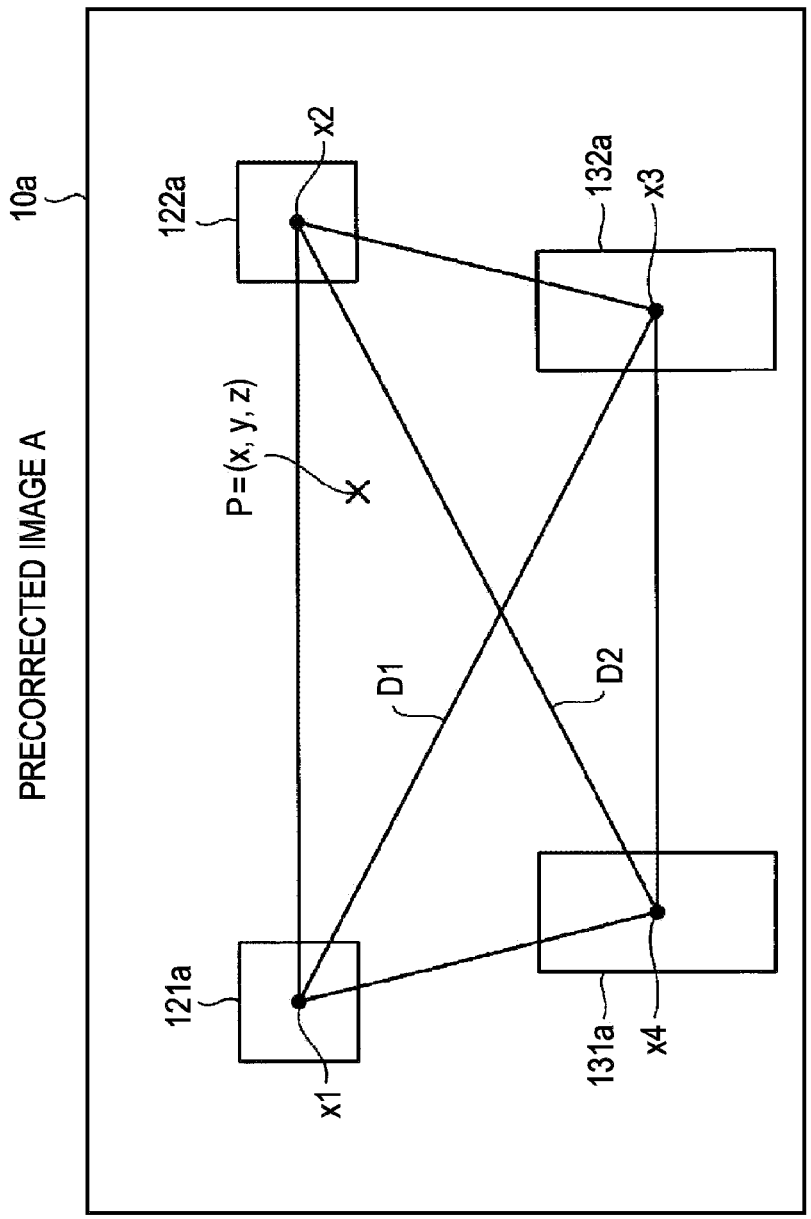
FIG. 13 is a view for explaining a method for calculating the correction factor inside a polygon, according to the second embodiment.
Figure 14:
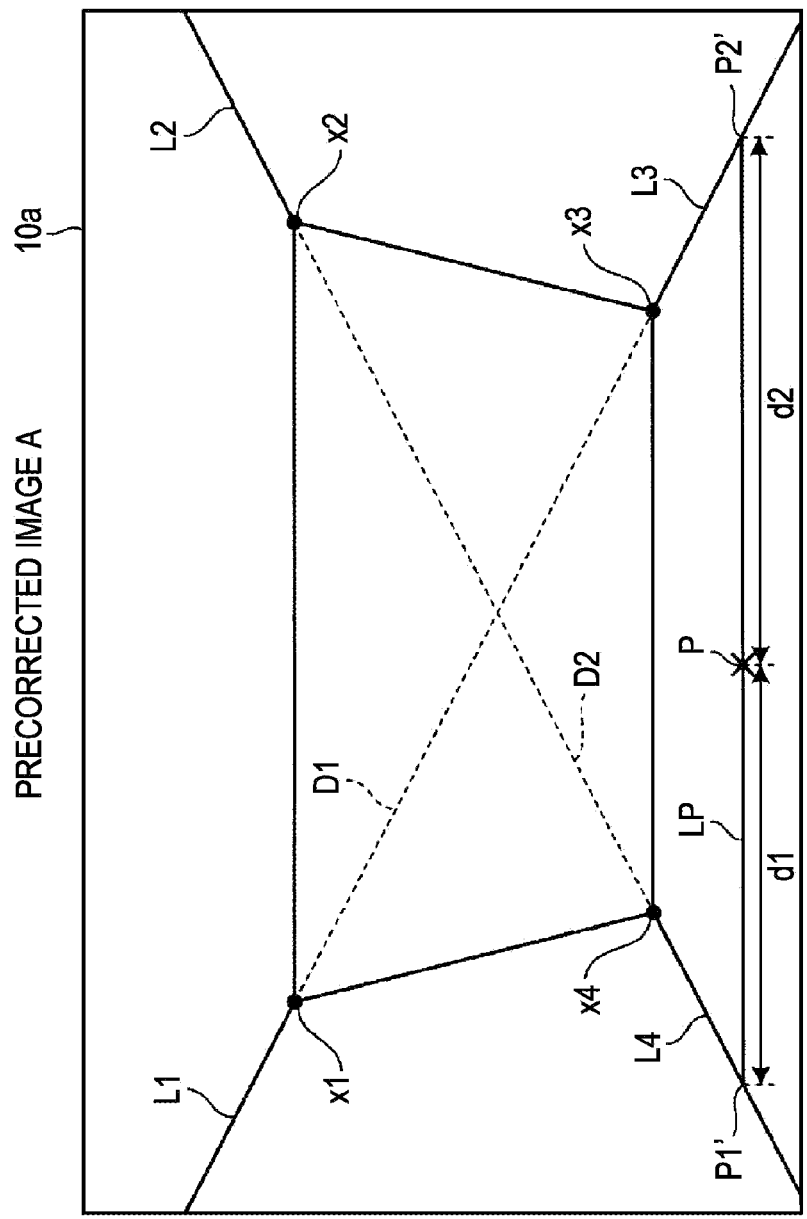
FIG. 14 is a view for explaining a method for calculating the correction factor outside the polygon, according to the second embodiment.

With regard to each of the precorrected images A to D, a correction factor calculator 216 calculates the correction factors of the precorrected images A to D, based on the average pixel value of the four attention regions 121, 122, 131, and 132 existing in the image region 10 and the desired pixel value. Hereinafter, the correction factor calculation executed by the correction factor calculator 216 will be specifically described. FIG. 13 is a view for explaining a method for calculating the correction factor inside a polygon, according to the second embodiment. FIG. 14 is a view for explaining a method for calculating the correction factor outside the polygon, according to the second embodiment. Hereinafter, the processing for the precorrected image A will be described as an example.

First, as shown in FIG. 13, the correction factor calculator 216 extracts representative points x1, x2, x4, and x3 of the attention regions 121*a*, 122*a*, 131*a*, and 132*a*. In the present embodiment, the representative points x1, x2, x4, and x3 are respectively the centers of the attention regions 121*a*, 122*a*, 131*a*, and 132*a*.

Subsequently, the correction factor calculator 216 calculates each correction factor of the representative points x1 to x4. In the coordinate (x, y) where, for example, the left upper portion of the image region 10*a* is the origin, a correction factor z at a representative point P(x, y) is calculated by z=t(X)/a(X), wherein a(X) is the average pixel value in the attention region X including a representative point P, and t(X) is the desired pixel value. Hereinafter, the coordinate (x, y) and the correction factor z of each pixel are collectively described as (x, y, z). The correction factor calculator 216 then calculates the correction factor of a pixel in another coordinate based on the coordinates and the correction factors of the representative points x1 to x4. In the present embodiment, the correction factor inside a convex polygon surrounded by the representative points x1 to x4, the correction factor at the boundary of the convex polygon, and the correction factor outside the convex polygon may be calculated.

First, a method for calculating the correction factor inside the convex polygon will be described. As shown in FIG. 13, the convex polygon of the present embodiment is a rectangular shape surrounded by the four representative points x1 to x4. First, the correction factor calculator 216 compares the absolute value of the gradient of a diagonal D1 connecting the representative point x1 to the representative point x3 with the absolute value of the gradient of a diagonal D2 connecting the representative point x2 to the representative point x4. The correction factor calculator 216 then divides the rectangular shape, surrounded by the representative points x1 to x4, into two triangular regions with the use of the diagonal D1 or D2 with the smaller absolute value of the gradient.

Here, the absolute value A of the gradient of a diagonal passing through a representative point P1(x1, y1, z1) and a representative point P2(x2, y2, z2) is calculated by the following formula (1):

For example when the absolute value of the gradient of the diagonal D1 is $\Delta 1$, and the absolute value of the gradient of the diagonal D2 is $\Delta 2$, the correction factor calculator 216 divides the rectangular shape by the diagonal D1 when $\Delta 1 \leq \Delta 2$, and divides the rectangular shape by the diagonal D2 when $\Delta 1 > \Delta 2$. Namely, when $\Delta 1 \leq \Delta 2$, the rectangular shape is divided into a triangular region surrounded by the representative points x1, x2, and x3 and a triangular region surrounded by the representative points x1, x3, and x4. Meanwhile, when $\Delta 1 > \Delta 2$, the rectangular shape is divided into a triangular region surrounded by the representative points x1, x2, and x4 and a triangular region surrounded by the representative points x2, x3, and x4.

Subsequently, the correction factor calculator 216 calculates the correction factor z of the pixel in the rectangular shape based on the correction factor of the three representative points forming the triangular region including the pixel. The correction factor z of the pixel existing in the triangular region formed by the three representative points P1 (x1, y1, z1), P2(x2, y2, z2), and P3(x3, y3, z3) is calculated by the following formulae (2) to (4):

Namely, for example, the correction factor z in the pixel P(x, y) shown in FIG. 13 is calculated from the correction factors at the representative points x1, x2, and x3 when the rectangular shape is divided by the diagonal D1, meanwhile, it is calculated from the correction factors at the representative points x1, x2, and x4 when the rectangular shape is divided by the diagonal D2.

Subsequently, a method for calculating the correction factor outside the convex polygon will be described. Hereinafter, the outside region of the rectangular shape, surrounded by the representative points x1, x2, x3, and x4, in the image region 10*a* is simply referred to as the "outside region". First, the correction factor calculator 216 divides the outside region into four regions by the extensions of the two diagonals D1 and D2, whereby a pixel existing in the outside region belongs to a region surrounded by the extensions of the two diagonals, the two representative points, and the end of the image region 10*a*. For example, the pixel P shown in FIG. 14 is surrounded by an extension L3 of the diagonal D1, an extension L4 of the diagonal D2, a straight line connecting the representative point x3 to the representative point x4, and the lower end of the image region 10*a*. The pixel P is calculated by the following formula (5):

In the formula (5), z1 and z2 are the correction factors at the two representative points x4 and x3, and d1 and d2 are parallel to the straight line connecting the representative point x3 to the representative point x4. d1 is a distance from P1' to P, wherein P1' is the intersection between a straight line LP passing through P and the extension L4 of the diagonal D2, and d2 is a distance from P2' to P, wherein P2' is the intersection between the straight line LP passing through P and the extension L3 of the diagonal D1. The correction factor of a pixel on the extensions L3 and L4 of the diagonals may be included in any divisional outside region including the extensions L3 and L4 of the diagonals. For example, the correction factor of a pixel on the extension L4 of the diagonals may be calculated as the pixel belonging to either the divisional outside region including the left end of the image region 10*a* or the divisional outside region including the lower end of the image region 10*a*.

The correction factor calculator 216 of the image synthesis apparatus 2 according to the present embodiment divides the image region 10*a* into the inside region and the outside region of the rectangular shape surrounded by the representative points x1 to x4. The correction factor calculator 216 further divides the inside region into two regions, and divides the outside region into four regions. The correction factor calculator 216 then calculates the correction factor of the pixel in the image region 10*a* by the calculation method according to the region to which each pixel belongs.

The correction processor 214, as in the first embodiment, corrects the pixel value of each pixel of each of the precorrected images A to D based on the correction factor calculated by the correction factor calculator 216 and corresponding to each pixel.

Also in the present embodiment, as in the first embodiment, a similar processing is applied to the chromaticity, whereby a synthetic image with less unnatural feeling can be generated. The chromaticity may be calculated independent from the calculation of the brightness value, or the correction factor of the brightness value calculated by the correction factor calculator 216 may be used as the correction factor of the chromaticity. When the correction factor of the brightness value is applied to the correction factor of the chromaticity, the correction factor of the brightness value may be applied as it is, or may be normalized or weighted.

Further, as in the first embodiment, when the taken image of the next frame is input during the correction processing, the correction factor calculated based on the relevant taken image may be used in the taken image of the latest frame. In order to reduce the calculation amount, the correction factors are not calculated for all pixels in the image region 10*a*, but the image region 10*a* is divided into small blocks, and the representative point is determined for each block, whereby the correction factor at the representative point may be regarded as the correction factor of the entire block.

As described above, according to the image synthesis apparatus 2 of the second embodiment, the correction factor can be calculated considering not only the image horizontal direction but also the image vertical direction. Thus, even when the pixel values are substantially different between the upper and lower regions of the image region 10*a*, there is no possibility that the upper region is corrected to be excessively bright, and the lower region is corrected to be excessively dark, whereby the synthetic image free from unnatural feeling can be generated.

Figure 15:
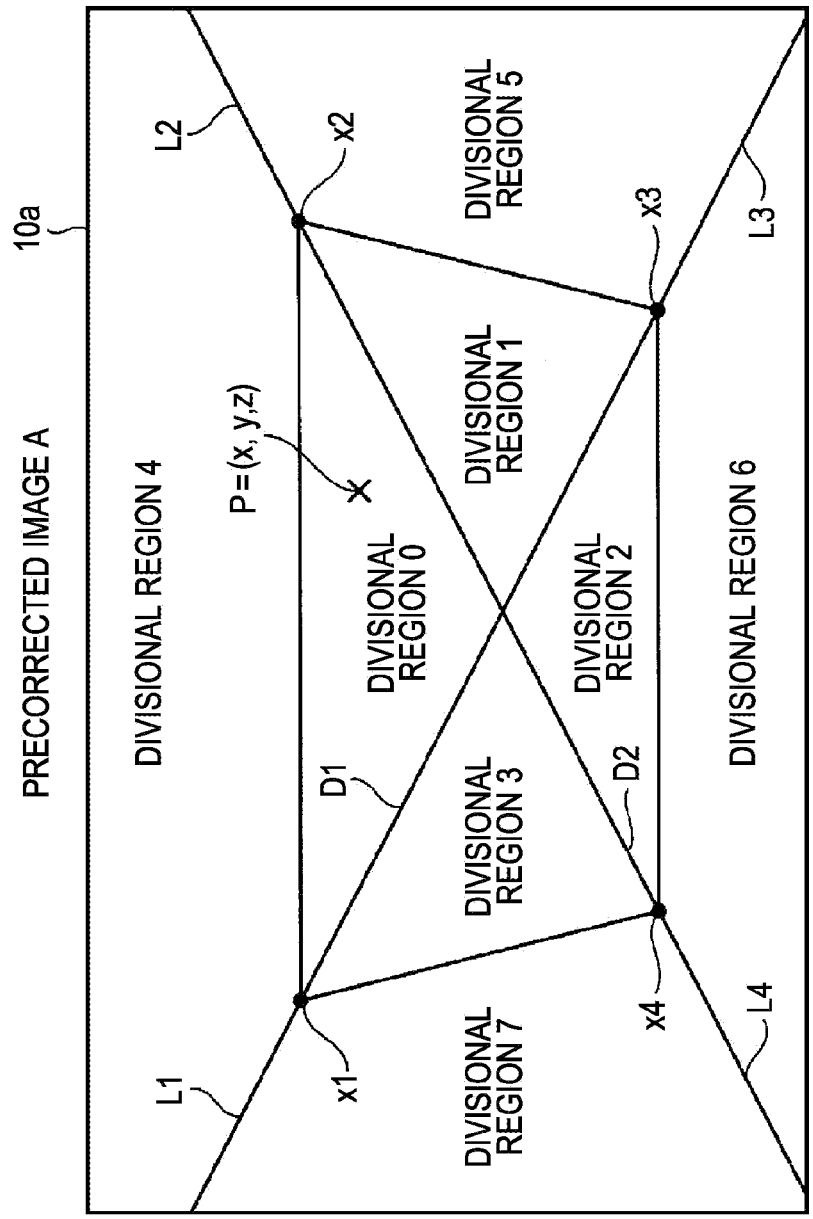
FIG. 15 is a view for explaining a method for calculating the correction factor when region numbers assigned to divisional regions are used.

When the correction factor of each pixel on the image region 10*a* is calculated, the arithmetic processing can be simplified by using a calculation method determination table. In that case, as shown in FIG. 15, the image region 10*a* is divided into eight regions by the representative points x1 to x4 and the diagonals D1 and D2, and these regions are assigned divisional regions 0 to 7 as the region numbers. The image synthesis apparatus 2 stores, as the calculation method determination table, a range of each divisional region, a formula used in the calculation of the correction factor of the pixel in each divisional region, and a variable value required for the calculation of the correction factor by associating them with the region numbers.

In the outside region of the rectangular shape (the divisional regions 4 to 7), the variable values used in the calculation of the correction factor are the correction factors z1 and z2 at the two representative points. In the inside regions (the divisional regions 0 to 3), the variable values are the coordinates and the correction factors of the three representative points and a and b calculated by the formulae (3) and (4) by using the coordinates and the correction factors. In the method for calculating the correction factor of the pixels in the divisional regions 0 to 3, the representative point used in the calculation of the correction factor is different depending on division by either the diagonal D1 or the diagonal D2, and therefore, the variable value of two patterns is stored in the calculation method determination table for each divisional region. The image synthesis apparatus 2 has a predetermined storage (not shown) for storing the calculation method determination table. In the outside region, the values of d1 and d2 can be obtained from (x, y).

For example, when the correction factor of the pixel P(x, y, z) shown in FIG. 15 is calculated, the correction factor calculator 216 refers to the calculation method determination table and determines that the pixel P belongs to the divisional region with the region number 0. Further, the correction factor calculator 216 refers to the calculation method determination table and determines the formula and the variable value corresponding to the region number 0. At this time, when the pixel belongs to the inside region of the rectangular shape like the pixel P, the correction factor calculator 216 has flag information showing that the rectangular shape has been divided by which of the diagonals D1 and D2, whereby the correction factor calculator 216 selects the variable value, corresponding to the flag information, from the variable values stored with two patterns.

Figure 16:
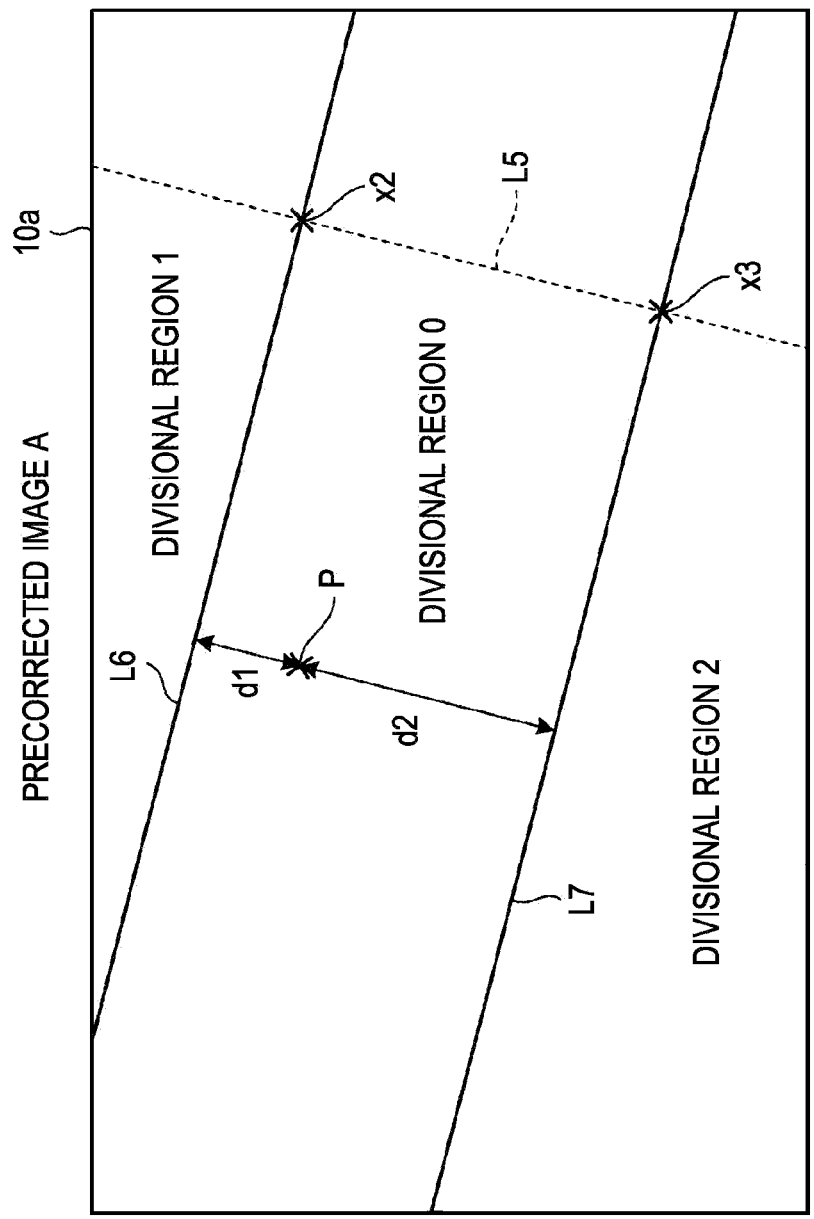
FIG. 16 is a view for explaining a method for calculating the correction factor in the precorrected image A when a synthetic image is generated with the use of cameras 1a to 1c.
Figure 17:
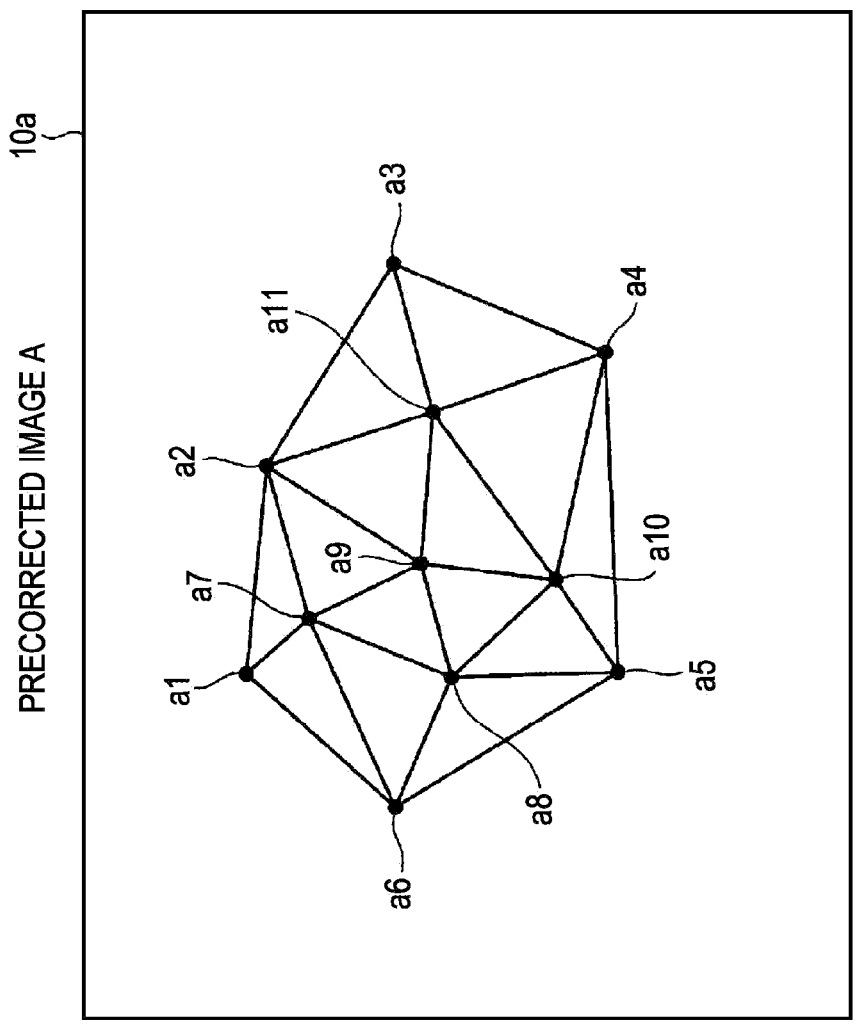
FIG. 17 is a view for explaining a way of dividing the inside of a polygon when 5 or more attention regions are provided.
Figure 18:
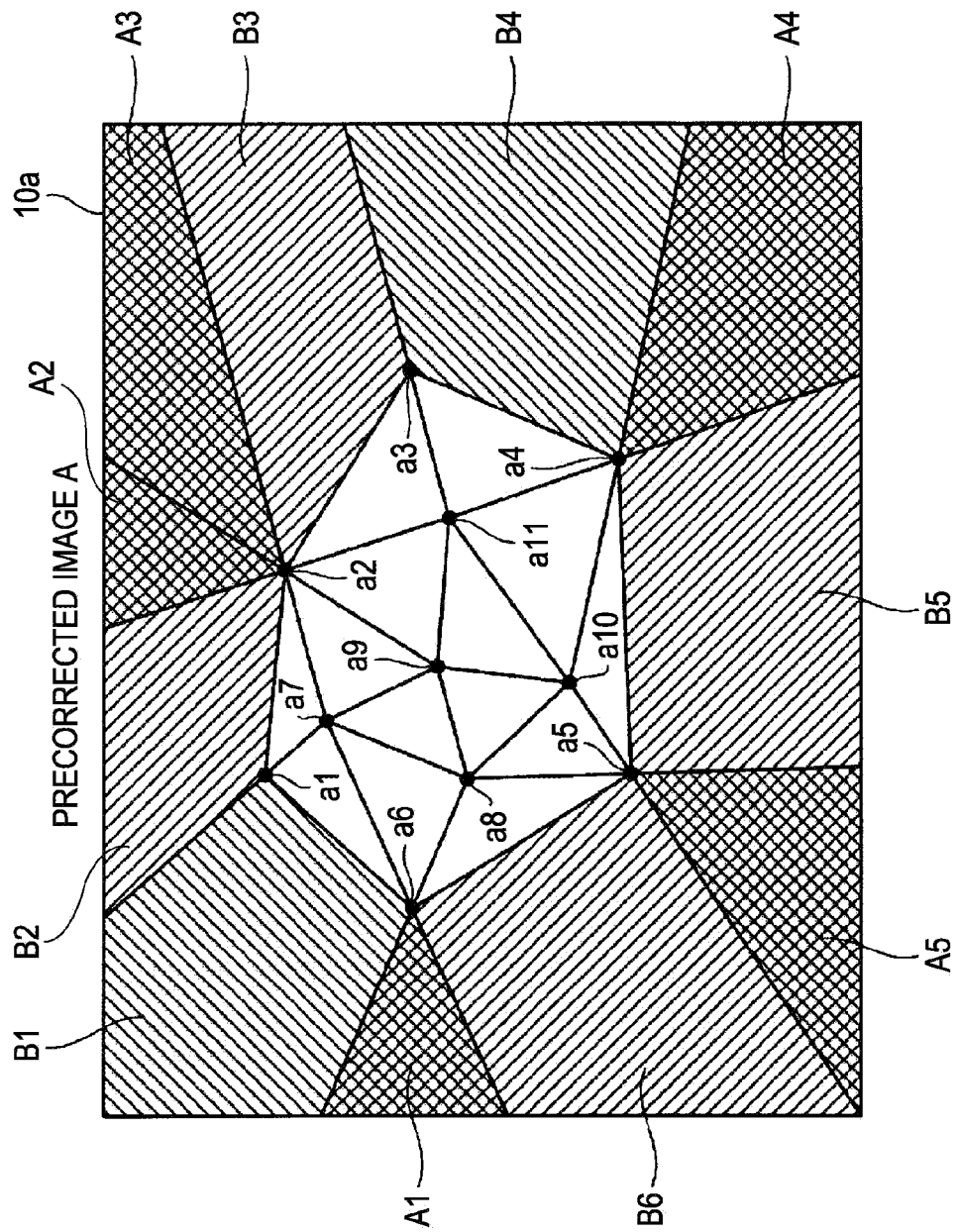
FIG. 18 is a view for explaining a way of dividing the outside of the polygon when 5 or more attention regions are provided.
Figure 19:
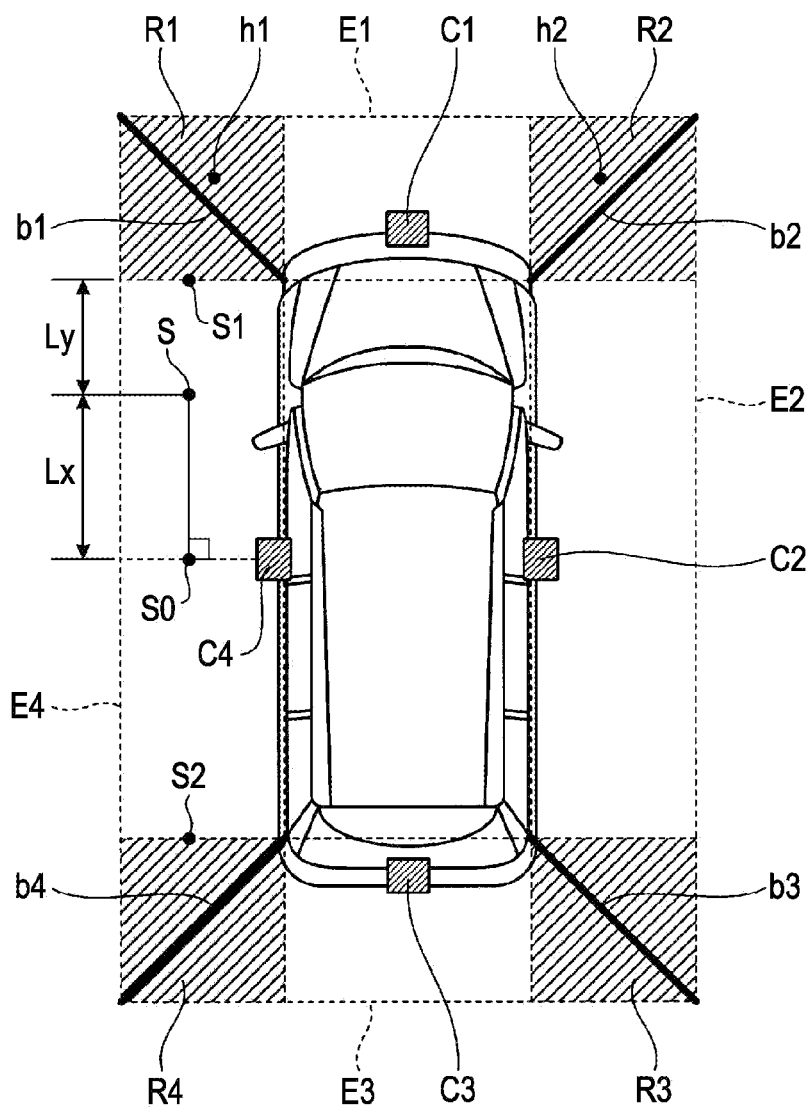
FIG. 19 is a view showing an example of a synthetic image generated by the prior art image display system.
Figure 20:
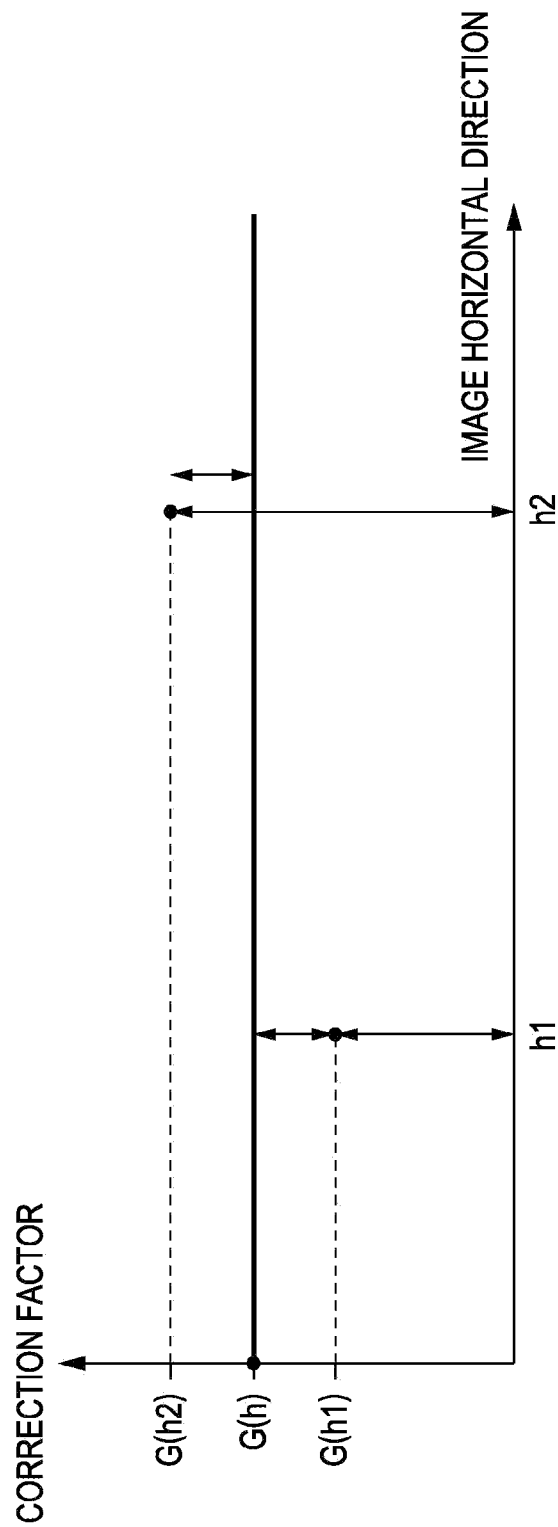
FIG. 20 is a view for explaining a correction factor calculating method described in Japanese Laid-open Patent Publication No. 2008-77595.
Figure 21:
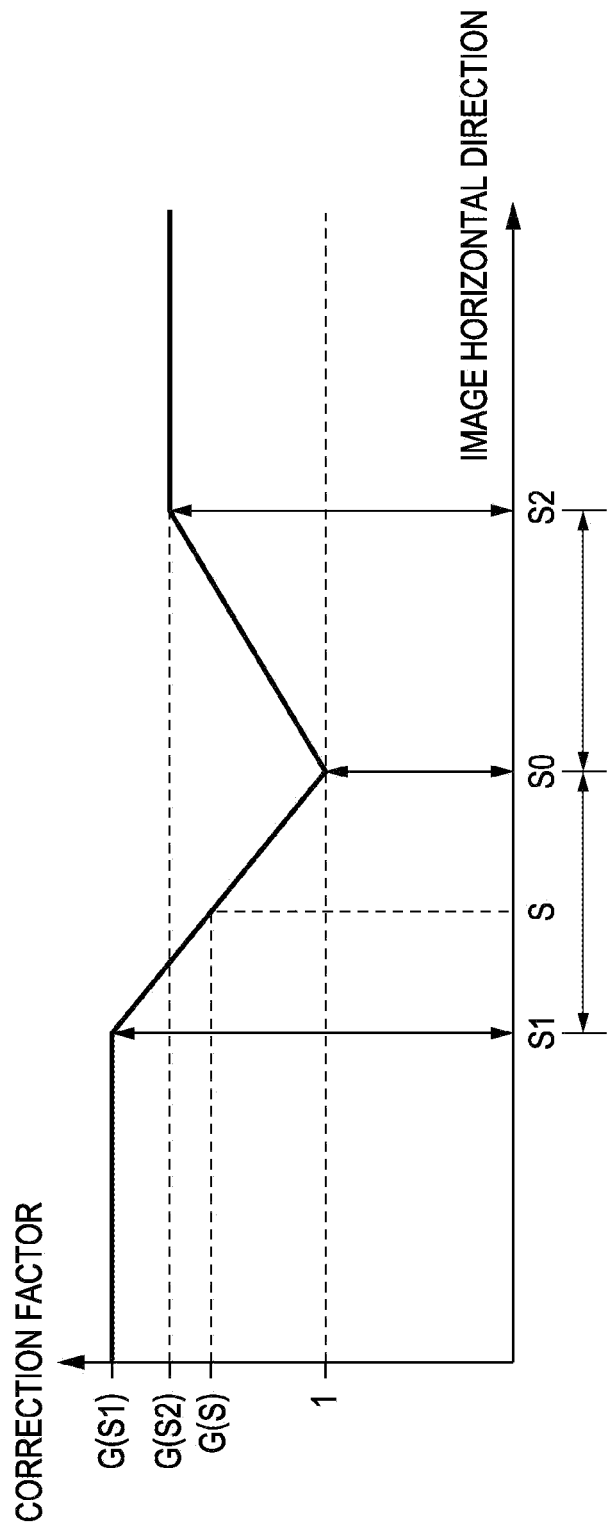
FIG. 21 is a view for explaining a correction factor calculating method described in Japanese Laid-open Patent Publication No. 2008-79248.

In the present embodiment, the correction factor is calculated by extracting the four attention regions from the image region 10*a*; however, even when other than four attention regions are extracted, the correction factor in the entire image region 10*a* can be calculated based on the correction factor at the representative points of each attention region. Hereinafter, a method for calculating the correction factor in that case will be described with reference to the drawings. FIG. 16 is a view for explaining the method for calculating the correction factor in the precorrected image A when the synthetic image is generated with the use of the cameras 1*a* to 1*c*. FIG. 17 is a view for explaining a way of dividing the inside of a polygon when 5 or more attention regions are provided. FIG. 18 is a view for explaining a way of dividing the outside of the polygon when 5 or more attention regions are provided.

For example when the synthetic image is generated with the use of the cameras 1*a* to 1*c*, the image region 10*a* of the precorrected image A of the camera 1*a* overlaps only the image region 10*b* of the precorrected image B of the camera 1*b*, and therefore, there are only the two representative points x2 and x3 on the image region 10*a* as shown in FIG. 16. In this case, the correction factor calculator 216 first extends extensions L6 and L7, which are perpendicular to a line L5 connecting the two representative points x2 and x3, from the representative points x2 and x3 and then divides the image region 10*a* into three regions. When three representative points of three or more representative points are arranged on a straight line, three or more representative points and extensions are provided, and therefore, the image region 10*a* is divided into more than three regions.

The correction factor calculator 216 calculates the correction factor of the pixel P in a region, surrounded by the extensions L6 and L7, by the formula (5) with the use of the correction factors at the two representative points x2 and x3 and the distances d1 and d2 from the pixel P to the extensions L6 and L7. The correction factor in the region higher than the extension L6 and the correction factor in the region lower than the extension L7 are kept constant, respectively, at the correction factor at the representative point x2 and the correction factor at the representative point x3.

When there is only one representative point, the correction factor of the entire image region 10*a* may be kept constant at the correction factor at the representative point. When there are three representative points, the correction factor of the pixel in a triangular region surrounded by the three representative points is calculated by the formulae (2) to (4) with the use of the correction factors at the three representative points. When the correction factor of the pixel outside the triangular region is calculated, the correction factor calculator 216 divides outside the triangular region into three regions by using extensions from the center of gravity of the triangular region toward each vertex of the triangular region. The correction factor calculator 216 calculates the correction factor by the formula (5) with the use of, for example, the correction factors at the two representative points included in each region.

As shown in FIG. 17, when there are five or more attention regions, or when a polygon includes the representative point, the inside of a convex polygon surrounded by representative points a1 to a6 can be divided into a plurality of triangular regions with the use of, for example, Delaunay triangle division. A pixel in the convex polygon can be calculated by using the formula (2), based on the correction factors at the three representative points forming a triangular region to which the pixel belongs. Also in this case, the correction factor can be simply calculated by using the calculation method determination table.

With regard to the outside region, as shown in FIG. 18, regarding the sides forming the triangular region including the representative points a1 to a6 forming the convex polygon, the sides other than the side which defines the outer circumference of the convex polygon is divided by extensions extending on the sides of the representative points a1 to a6 forming the convex polygon, whereby the outside region is divided into 11 divisional outside regions. The 11 divisional outside regions are classified into first regions A1 to A5 including only one representative point and second regions B1 to B6 including two representative points. The correction factors of the first regions A1 to A5 are kept constant at the correction factor at the representative point included in each region. The correction factors of the second regions B1 to B6 are calculated by the formula (5), based on the correction factors at the two representative points included in each region.

For example, in each of the above embodiments, the image taken by the cameras 1a to 1d is a moving image, but it is not limited thereto, and it may be a still image.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image synthesis apparatus comprising:
   an image obtainer which obtains a plurality of images taken by a plurality of cameras;
   a pixel value corrector which, with respect to each of the images, calculates, as a correction factor of an average pixel value in overlap regions located at the both ends of an image with an image region of an image taken by another camera among the plurality of cameras, a correction factor such that the average pixel value after correction in the overlap region and the average pixel value after correction in an overlap region, which is located in the image taken by the another camera overlapping the overlap region, correspond to each other, and, in the adjacent direction of the images, calculates the correction factor of a pixel value in a region other than the overlap regions by a predetermined continuous function connecting the correction factors in the overlap regions located at the both ends of the image and corrects the entire image based on the calculated correction factor;
   a correction factor calculator which, with respect to each of the images, calculates the correction factor of the pixel value at a representative point, which is one pixel in the overlap region in the image, based on the average pixel value of the overlap region and a desired value and, in the horizontal direction of the image, when the correction factor from the representative point to the left or right end of the image, which is closer to the representative point, is the same as the correction factor at the representative point, calculates the correction factor between the representative points, determined for each of the overlap regions in the image, by a predetermined continuous function connecting the correction factors at the representative points;
   a synthetic image generator which synthesizes the images corrected by the pixel value corrector to generate one synthetic image; and
   an image output which outputs the synthetic image generated by the synthetic image generator to an external apparatus.

2. The image synthesis apparatus as claimed in claim 1, wherein the pixel value corrector comprises:
   a feature quantity calculator which, with respect to each of the images, calculates the average pixel value of each of the overlap regions;
   a desired value calculator which, with respect to each of the overlap regions, calculates the desired value of the average pixel value after correction based on the average pixel value of the overlap region in one image and the average pixel value of the overlap region in another image; and
   a correction processor which corrects the pixel value of a pixel of each of the images, based on the correction factor calculated by the correction factor calculator and corresponding to the pixel.

3. The image synthesis apparatus as claimed in claim 2, wherein the feature quantity calculator extracts one attention region from the overlap region and calculates the average pixel value of the extracted attention region,
   the desired value calculator calculates a desired value of the average pixel value after correction in the attention region, based on the average pixel value of the attention region in the image and the average pixel value of the attention region in another image overlapping the attention region, and
   the correction factor calculator calculates the correction factor at a representative point, which is one pixel in the attention region, based on the average pixel value of the attention region and the desired value.

4. The image synthesis apparatus as claimed in claim 2, wherein, in the horizontal direction of the image, when the correction value at a predetermined position between the representative points is more than a threshold value, the correction factor calculator determines the correction factor at the predetermined position as the value of the threshold value and calculates the correction factor between the predetermined position and the representative point by a predetermined continuous function connecting the correction factor at the predetermined position and the correction factor at the representative point.

5. An image synthesis method executed by a computer, comprising:
   an image obtaining operation of obtaining a plurality of images taken by a plurality of cameras;
   a pixel value correcting operation of, with respect to each of the images, calculating, as a correction factor of an average pixel value in overlap regions located at the both ends of an image with an image region of an image taken by another camera among the plurality of cameras, a correction factor such that the average pixel value after correction in the overlap region and the average pixel value after correction in an overlap region, which is located in the image taken by the another camera overlapping the overlap region, correspond to each other, and, in the adjacent direction of the images, calculating the correction factor of a pixel value in a region other than the overlap regions by a predetermined continuous function connecting the correction factors in the overlap regions located at the both ends of the image and correcting the entire image based on the calculated correction factor;

a correction factor calculating operation of, with respect to each of the images, calculating the correction factor of the pixel value at a representative point, which is one pixel in the overlap region in the image, based on the average pixel value of the overlap region and a desired value and, in the horizontal direction of the image, when the correction factor from the representative point to the left or right end of the image, which is closer to the representative point, is the same as the correction factor at the representative point, calculating the correction factor between the representative points, determined for each of the overlap regions in the image, by a predetermined continuous function connecting the correction factors at the representative points;

a synthetic image generating operation of synthesizing the images corrected in the pixel value correcting operation to generate one synthetic image; and an image output operation of outputting the synthetic image generated in the synthetic image generating operation to an external apparatus.

6. The image synthesis method as claimed in claim 5, wherein the pixel value correction operation comprises:

a feature quantity calculating operation of, with respect to each of the images, calculating each average pixel value of the overlap regions;

a desired value calculating operation of, with respect to each of the overlap regions, calculating the desired value of the average pixel value after correction based on the average pixel value of the overlap region in one image and the average pixel value of the overlap region in another image; and a correction processing operation of correcting a pixel value of a pixel of each of the images based on the correction factor calculated in the correction factor calculating operation and corresponding to the pixel.

7. The image synthesis method as claimed in claim 6, wherein in the feature quantity calculating operation, one attention region is extracted from the overlap region, and the average pixel value of the extracted attention region is calculated, in the desired value calculating operation, a desired value of the average pixel value after correction in the attention region is calculated based on the average pixel value of the attention region in the image and the average pixel value of the attention region in another image overlapping the attention region, and in the correction factor calculating operation, the correction factor at a representative point, which is one pixel in the attention region, is calculated based on the average pixel value of the attention region and the desired value.

8. The image synthesis method as claimed in claim 6, wherein, in the correction factor calculating operation, in the horizontal direction of the image, when the correction value at a predetermined position between the representative points is more than a threshold value, the correction factor at the predetermined position is determined as the value of the threshold value, and the correction factor between the predetermined position and the representative point is calculated by a predetermined continuous function connecting the correction factor at the predetermined position and the correction factor at the representative point.

* * * * *